US008817306B2

(12) United States Patent  
Sato

(10) Patent No.: US 8,817,306 B2  
(45) Date of Patent: Aug. 26, 2014

(54) INFORMATION PROCESSING SYSTEM AND MANAGEMENT METHOD

(71) Applicant: Canon Kabushiki Kaisha, Tokyo (JP)

(72) Inventor: Kei Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 13/650,224

(22) Filed: Oct. 12, 2012

(65) Prior Publication Data

US 2013/0100494 A1 Apr. 25, 2013

(30) Foreign Application Priority Data

Oct. 20, 2011 (JP) ................................. 2011-230251

(51) Int. Cl.
  *G06F 3/12* (2006.01)
  *H04N 1/32* (2006.01)
  *G06K 15/02* (2006.01)
  *G06K 15/00* (2006.01)

(52) U.S. Cl.
  CPC .............. *G06K 15/1805* (2013.01); *H04N 1/32* (2013.01); *G06K 15/1809* (2013.01); *G06K 15/402* (2013.01)
  USPC ........... 358/1.15; 358/1.1; 358/1.9; 358/1.13; 709/223; 709/230

(58) Field of Classification Search
  None
  See application file for complete search history.

(56) References Cited

U.S. PATENT DOCUMENTS

| 7,075,670 | B1 * | 7/2006 | Koga | 358/1.15 |
| 7,417,767 | B2 * | 8/2008 | Kato | 358/1.9 |
| 2009/0089811 | A1 * | 4/2009 | Ferlitsch | 719/321 |

FOREIGN PATENT DOCUMENTS

JP 2007-130838 A 5/2007

* cited by examiner

*Primary Examiner* — Paul F Payer

(74) *Attorney, Agent, or Firm* — Carter, DeLuca, Farrell & Schmidt, LLP

(57) ABSTRACT

A setting value management service holds first operation setting information that is applied to an image forming apparatus belonging to a first management range managed thereby and second operation setting information which is applied to an image forming apparatus belonging to a second management range. The setting value management service generates third operation setting information, which is applied to the image forming apparatus, when a user who corresponds to the second management range uses the image forming apparatus belonging to the first management range, using the second operation setting information. The setting value management service accepts the operation setting information acquisition request from an image forming apparatus belonging to the first management range, which is used by a user who corresponds to the second management range, and returns the corresponding third operation setting information to the image forming apparatus.

9 Claims, 14 Drawing Sheets

FIG. 4A

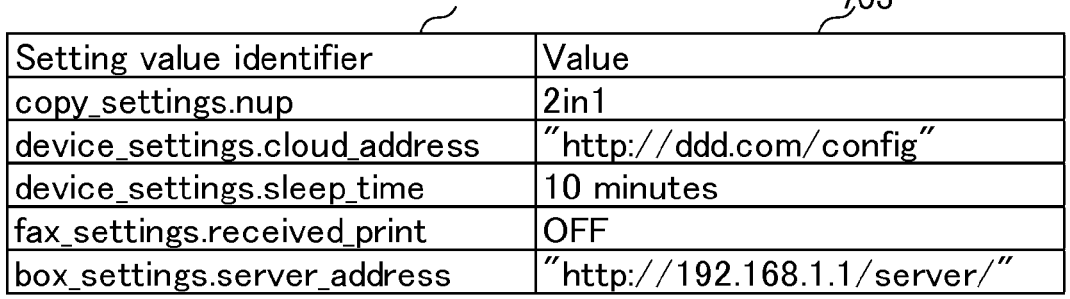

| Setting value identifier | Value |
|---|---|
| copy_settings.nup | 2in1 |
| device_settings.cloud_address | "http://ddd.com/config" |
| device_settings.sleep_time | 10 minutes |
| fax_settings.received_print | OFF |
| box_settings.server_address | "http://192.168.1.1/server/" |

FIG. 4B

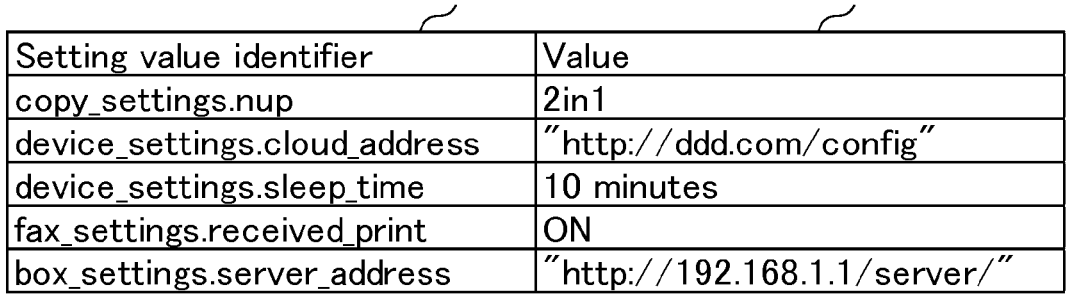

| Setting value identifier | Value |
|---|---|
| copy_settings.nup | 2in1 |
| device_settings.cloud_address | "http://ddd.com/config" |
| device_settings.sleep_time | 10 minutes |
| fax_settings.received_print | ON |
| box_settings.server_address | "http://192.168.1.1/server/" |

FIG. 4C

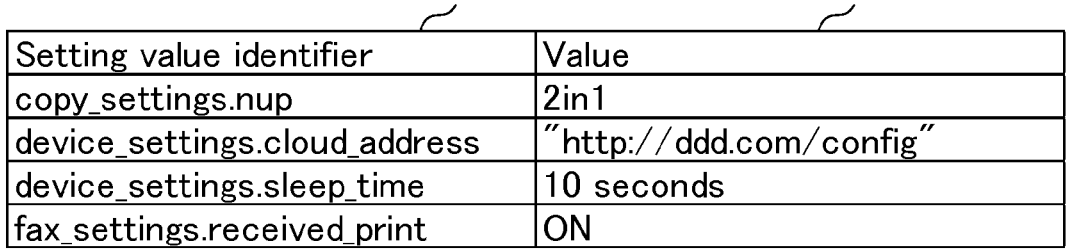

| Setting value identifier | Value |
|---|---|
| copy_settings.nup | 2in1 |
| device_settings.cloud_address | "http://ddd.com/config" |
| device_settings.sleep_time | 10 seconds |
| fax_settings.received_print | ON |

FIG. 6

| Device identifier | Tenant identifier | External use tenant identifier | Virtual device configuration data | Virtual configuration data | Notification flag |
|---|---|---|---|---|---|
| 010001 | 100 | — | 1 | 1 | Not-notified |
| 010002 | 100 | — | 2 | 2 | Not-notified |
| 020001 | 100 | — | 3 | 3 | Notified |
| 010010 | 200 | — | 4 | 4 | Notified |
| 010010 | 200 | 100 | 4 | 6 | — |
| 010020 | 300 | — | 4 | 5 | Notified |
| 010020 | 300 | 100 | 4 | 7 | — |

FIG. 7A

| Setting value identifier | Default value | Value range | Condition |
|---|---|---|---|
| copy_settings.nup | 1in1 | 1 in 1, 2 in 1, 4 in 1 | None |
| device_settings.cloud_address | "http://ddd.com/config" | 256 bytes | None |
| device_settings.sleep_time | 10 minutes | 1 minute, 10 minutes, 1 hour | None |
| fax_settings.received_print | OFF | ON,OFF | Facsimile unit |
| box_settings.server_address | "" | 256 bytes | None |

FIG. 7B

| Setting value identifier | Default value | Value range | Condition |
|---|---|---|---|
| Copy_settings.nup | 1in1 | 1 in 1, 2 in 1, 4 in 1 | None |
| Device_settings.cloud_address | "http://ddd.com/config" | 256 bytes | None |
| Device_settings.sleep_time | 10 seconds | 10 seconds, 1 minute, 10 minutes, 1 hour | None |
| Fax_settings.received_print | OFF | ON, OFF | Facsimile unit |

FIG. 8

| Setting value identifier | Value |
|---|---|
| copy_settings.nup | 2 in 1 |
| device_settings.cloud_address | "http://ddd.com/config" |
| device_settings.sleep_time | 10 seconds |
| fax_settings.received_print | ON |
| box_settings.server_address | "http://192.168.1.1/server/" |

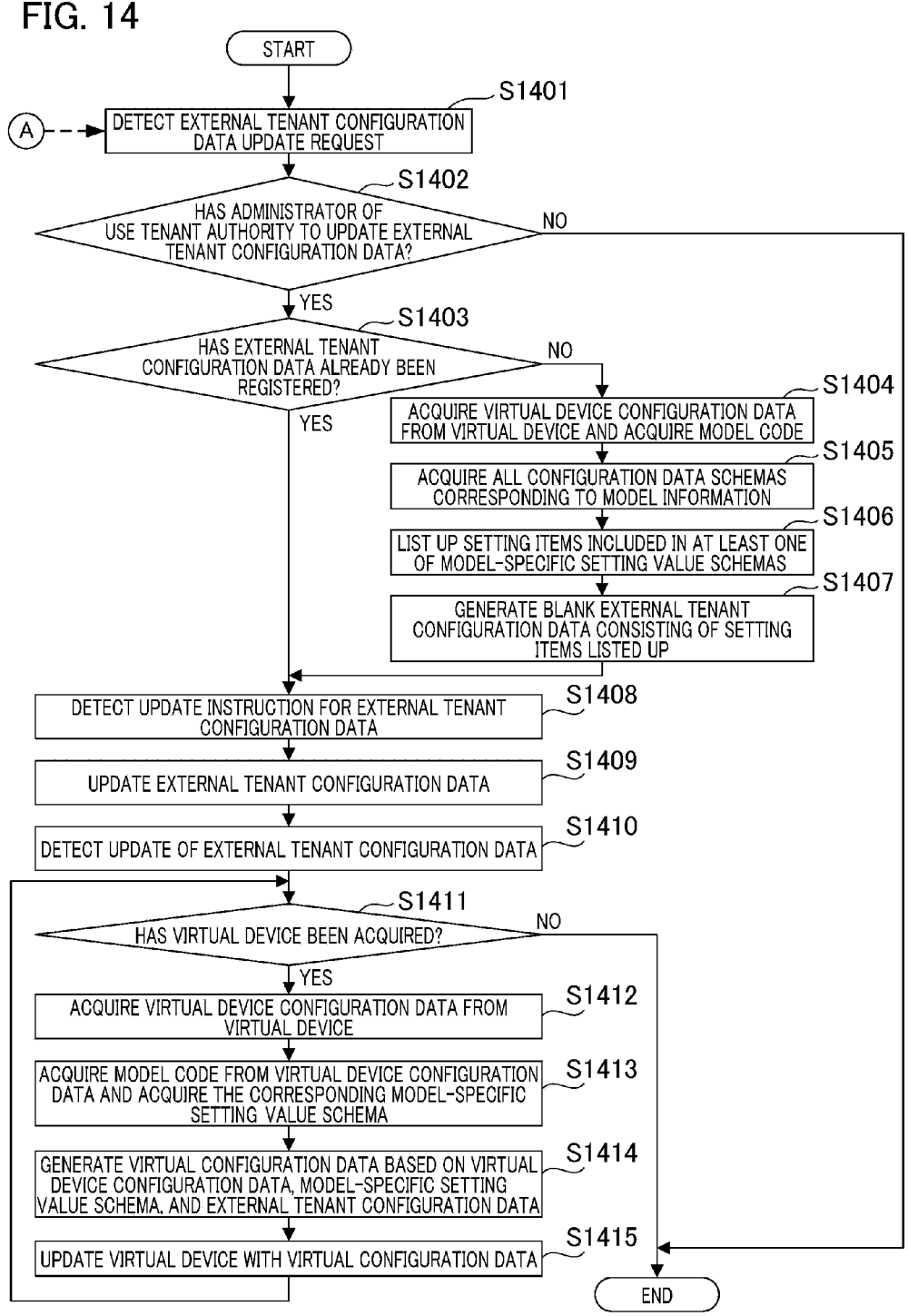

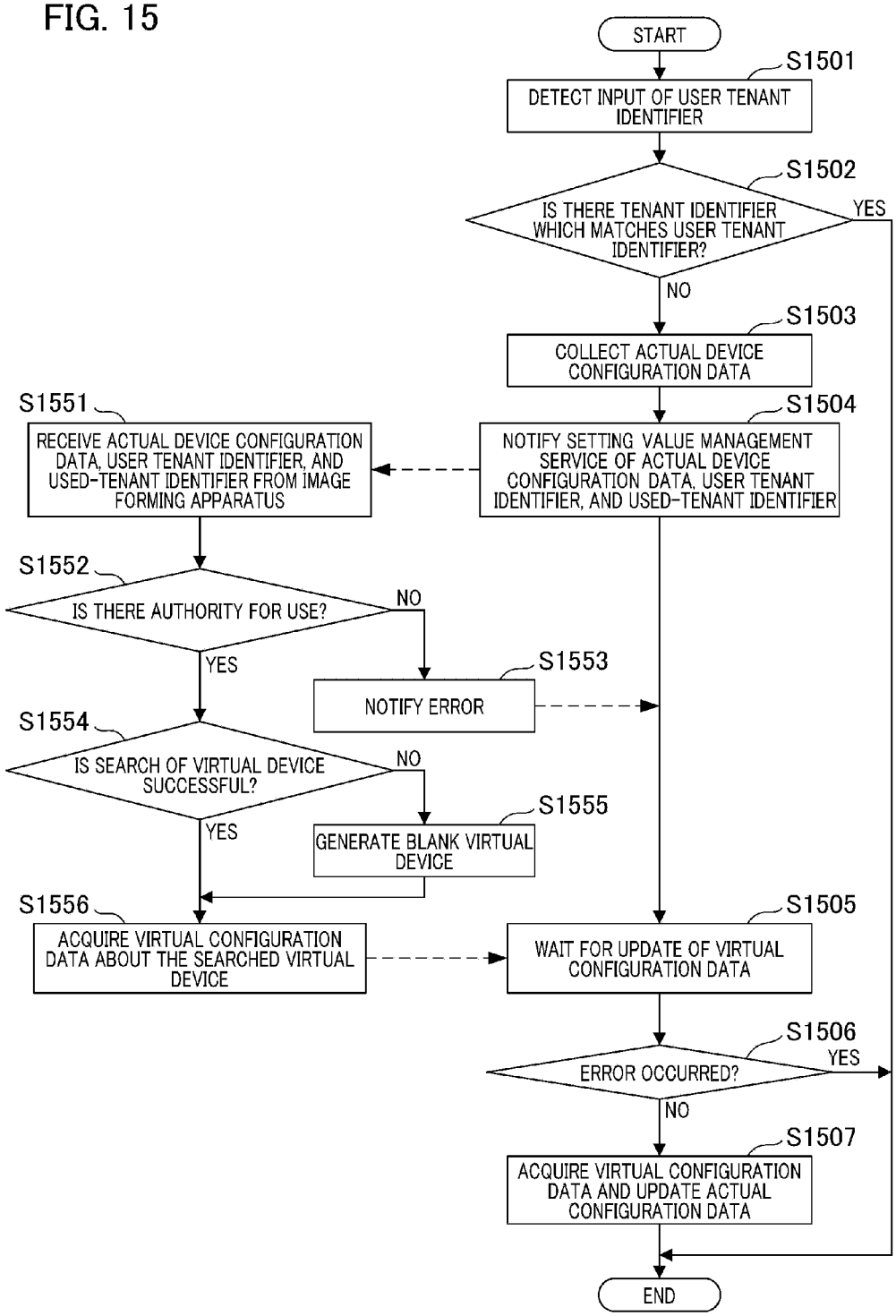

INFORMATION PROCESSING SYSTEM AND MANAGEMENT METHOD

BACKGROUND OF THE INVENTION

1. Field of the Invention

The present invention relates to an information processing system and a management method.

2. Description of the Related Art

There has been proposed an image forming apparatus that stores configuration data in a storage unit. The configuration data is setting information (operation setting information) for switching the operation of the image forming apparatus. Since configuration data is stored in the storage unit provided in each of the image forming apparatuses, the setting changes in configuration data need to be made by the number of image forming apparatuses in order to change configuration data for all of the image forming apparatuses. For saving the time and required for changing the settings of configuration data by the number of image forming apparatuses, there has been proposed a technology in which the settings of configuration data for a plurality of image forming apparatuses are made at one time by a certain information processing apparatus.

For example, Japanese Patent Laid-Open No. 2007-130838 discloses an image forming system in which a plurality of image forming apparatuses, to which the initial setting operation has been performed, downloads initial system setting information from a server and reflects the downloaded initial system setting information to the initial setting content.

An information processing system is contemplated in which a management apparatus manages a plurality of image forming apparatuses via a network on tenant basis corresponding to a user (s) of the plurality of image forming apparatuses. Here, a user may wish to output a printout using an image forming apparatus in another tenant that is different from the tenant to which he/she belongs, such as a branch convenience store, a branch business office, or the like, instead of using an image forming apparatus in the tenant to which he/she belongs. In this case, an assumption is made such that the user may wish to use an image forming apparatus with the settings defined by his/her own company for reasons of increasing the security strength thereof.

However, the usage of configuration data across tenants has not conventionally been conceived. Thus, when a user uses an image forming apparatus in another tenant that is different from the tenant to which he/she belongs, the user himself/herself has conventionally been required to set configuration data of the image forming apparatus to be used, resulting in an inconvenience for the user.

In addition, for an administrator who operates the management apparatus so as to manage configuration data for an image forming apparatus, it is undesirable that a user who belongs to a tenant not managed by the management apparatus makes the setting changes of the image forming apparatus managed by the management apparatus.

SUMMARY OF THE INVENTION

The information processing system of the present invention manages the operation setting of an image forming apparatus for each management range of a user and automatically applies the operation setting that is applied to an image forming apparatus within the management range of the user to an image forming apparatus which lies outside the management range and is used by the user.

According to an aspect of the present invention, an information processing system is provided that includes a management apparatus that manages operation setting information for switching the operation of an image forming apparatus; and an image forming apparatus that is managed by the management apparatus for each preset management range of a user. The image forming apparatus includes a requesting unit configured to transmit an acquisition request for operation setting information corresponding to the image forming apparatus, which includes configuration information about the devices provided in the image forming apparatus and information regarding the management range of a user who uses the image forming apparatus, to the management apparatus via a network; and an acquiring unit configured to acquire the operation setting information from the management apparatus as a response to the operation setting information acquisition request. Also, the management apparatus includes a first holding unit configured to hold first operation setting information which is applied to the image forming apparatus belonging to a first management range, which is the management range managed by the management apparatus; a second holding unit configured to hold second operation setting information that is commonly applied to the image forming apparatus belonging to a second management range; a generating unit configured to generate third operation setting information that is applied to the image forming apparatus, when a user who corresponds to the second management range uses the image forming apparatus belonging to the first management range, using the second operation setting information, and configured to store information including correspondence information among the third operation setting information, information regarding the second management range, and configuration information about the devices provided in an image forming apparatus used by the user as device information in a storage unit; a request accepting unit configured to accept the operation setting information acquisition request from an image forming apparatus belonging to the first management range, which is used by a user who corresponds to the second management range, via the network; and an information transmitting unit configured to acquire the third operation setting information corresponding to the image forming apparatus based on configuration information about the devices provided in an image forming apparatus, which is used by the user, belonging to the first management range, the information regarding the second management range corresponding to the user, and the device information stored in the storage unit, all of which are included in the accepted operation setting information acquisition request, and configured to transmit them to the image forming apparatus.

Further features of the present invention will become apparent from the following description of exemplary embodiments with reference to the attached drawings.

BRIEF DESCRIPTION OF THE DRAWINGS

FIGS. 4A to 4C are diagrams illustrating an example of actual configuration data.

FIG. 6 is a diagram illustrating an exemplary virtual device.

FIGS. 7A and 7B are diagrams illustrating an exemplary model-specific setting value schema.

FIG. 8 is a diagram illustrating an example of tenant configuration data.

FIG. 14 is a flowchart illustrating processing for generating virtual configuration data.

FIG. 15 is a flowchart illustrating processing for acquiring virtual configuration data by an image forming apparatus.

DESCRIPTION OF THE EMBODIMENTS

Hereinafter, a description will be given of the information processing system of the present embodiment. Firstly, the terms used in the present embodiment are defined. The term "configuration data" refers to data (operation setting information) for switching the operation of an image forming apparatus. For example, configuration data corresponds to a default value for imposition of a copy job or the like. If the default value for imposition of a copy job is set to "1 in 1", one page is printed on a single sheet of paper as a result of copying. If the default value for imposition of a copy job is set to "2 in 1", two pages are printed on a single sheet of paper as a result of copying.

The term "device configuration data" refers to data indicating the configuration of a device provided in an image forming apparatus. For example, device configuration data indicates whether or not an image forming apparatus includes a facsimile unit. Examples of device configuration data include a model code for uniquely identifying the model of an image forming apparatus, a running firmware version, and the like.

The term "model-specific setting value schema" refers to data for defining the schema of configuration data that is held by a specific model of an image forming apparatus. The term "schema" refers to data for defining the convention and positioning for configuration data. Examples of such a model-specific setting value schema include a condition(s) for validating the setting value identifier for each configuration data, the default value, the value range, and data. In the present embodiment, it is assumed that there is a difference between configuration data to be held depending on the model of an image forming apparatus and a set value schema is prepared for different models of an image forming apparatus.

Figure 1:
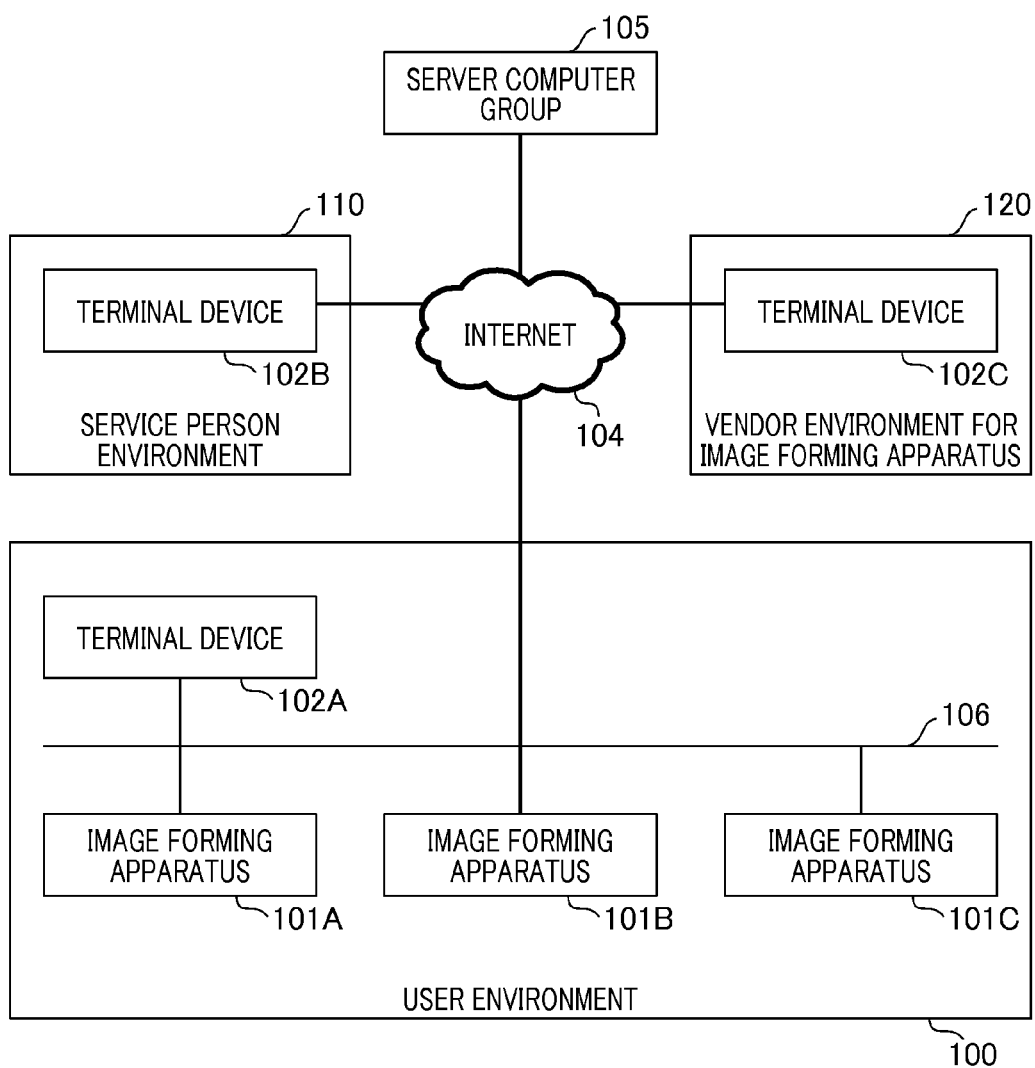
FIG. 1 is a diagram illustrating an exemplary general configuration of the present embodiment.

The term "virtual device" refers to a data group of actual devices held by a server computer group. More specifically, a virtual device includes at least device configuration data and configuration data. The term "tenant" refers to a unit of consignor to whom a user consigns the management of an image forming apparatus. In other words, a tenant is a management range of a user. The term "tenant identifier" refers to an identifier for uniquely identifying a tenant. For example, assume the case where management of image forming apparatuses 101A, 101B, and 101C in a user environment 100 (to be described below) shown in FIG. 1 is consigned by a certain company. In this case, a corresponding tenant identifier is assigned to the user environment 100 and the image forming apparatuses 101A, 101B, and 101C are recognized and managed as the image forming apparatuses belonging to the tenant.

The definition is given as follows so as to distinguish among data included in a virtual device, data held by an actual device, and data dedicated for a tenant. Device configuration data included in a virtual device is referred to as "virtual device configuration data" and configuration data included in a virtual device is referred to as "virtual configuration data". Device configuration data held by an actual device is referred to as "actual device configuration data" and configuration data held by an actual device is referred to as "actual configuration data". Configuration data that is commonly used by image forming apparatuses in a tenant is referred to as "tenant configuration data". Also, configuration data that is commonly used by image forming apparatuses belonging to the external tenant is referred to as "external tenant configuration data".

A description will be given below of the information processing system of the present embodiment with reference to the drawings. Firstly, a description will be given of the use of configuration data closed in one tenant. The use of configuration data closed in one tenant means that, when a user uses an image forming apparatus in a tenant to which the user himself/herself belongs, the image forming apparatus acquires and applies configuration data corresponding to the image forming apparatus via a network.

FIG. 1 is a diagram illustrating an exemplary general configuration of the present embodiment. The information processing system shown in FIG. 1 includes a user environment 100, a server computer group 105, a service person environment 110, and a vendor environment 120 for image forming apparatuses. The user environment 100, the server computer group 105, the service person environment 110, and the vendor environment 120 for image forming apparatuses communicate with each other via Internet 104. The Internet 104 is a network that is capable of providing digital communication on a public line.

The user environment 100 is an environment where a user of an image forming apparatus executes the operation of the image forming apparatus. The user environment 100 includes image forming apparatuses 101A, 101B, and 101C and a terminal apparatus 102A. The image forming apparatuses 101A, 101B, and 101C are the image forming apparatuses of the present embodiment. A network 106 is a network that is capable of providing digital communication in the user environment 100. The image forming apparatuses 101A, 101B, and 101C can access the Internet 104 via the network 106. The terminal apparatus 102A is a computer that is operable by a user of the user environment 100. The terminal apparatus 102A can also access the Internet 104 via the network 106.

The service person environment 110 is an environment where a service person manages an image forming apparatus using the terminal apparatus 102B. The service person environment 110 includes a terminal apparatus 102B. The terminal apparatus 102B is a computer that is operated by a service person who manages the image forming apparatuses 101A, 101B, and 101C. The terminal apparatus 102B can access the Internet 104.

The vendor environment 120 for image forming apparatuses is an environment where management personnel of a vendor for producing an image forming apparatus perform the maintenance of data which is required for the management of an image forming apparatus. The vendor environment 120 for image forming apparatuses includes a terminal apparatus 102C. The terminal apparatus 102C is a computer that is operated by management personnel of a vendor for producing an image forming apparatus. The terminal apparatus 102C can access the Internet 104.

The server computer group 105 is a server group that provides a setting value management service 310 (see FIG. 3) for managing configuration data for image forming apparatuses. The server computer group 105 provides a service to a plurality of tenants via the Internet 104. In the present embodiment, the setting value management service 310 provided by the server computer group 105 functions as a management apparatus that manages configuration data for image forming apparatuses. The setting value management service 310 manages image forming apparatuses by associating them with tenants that are a preset management range. In other words, the setting value management service 310 manages the image forming apparatuses for each management range. In the following description, the image forming apparatuses 101A, 101B, and 101C are also described as the image forming apparatus 101 and the terminal apparatuses 102B and 102C are also described as the terminal apparatus 102.

Figure 2:
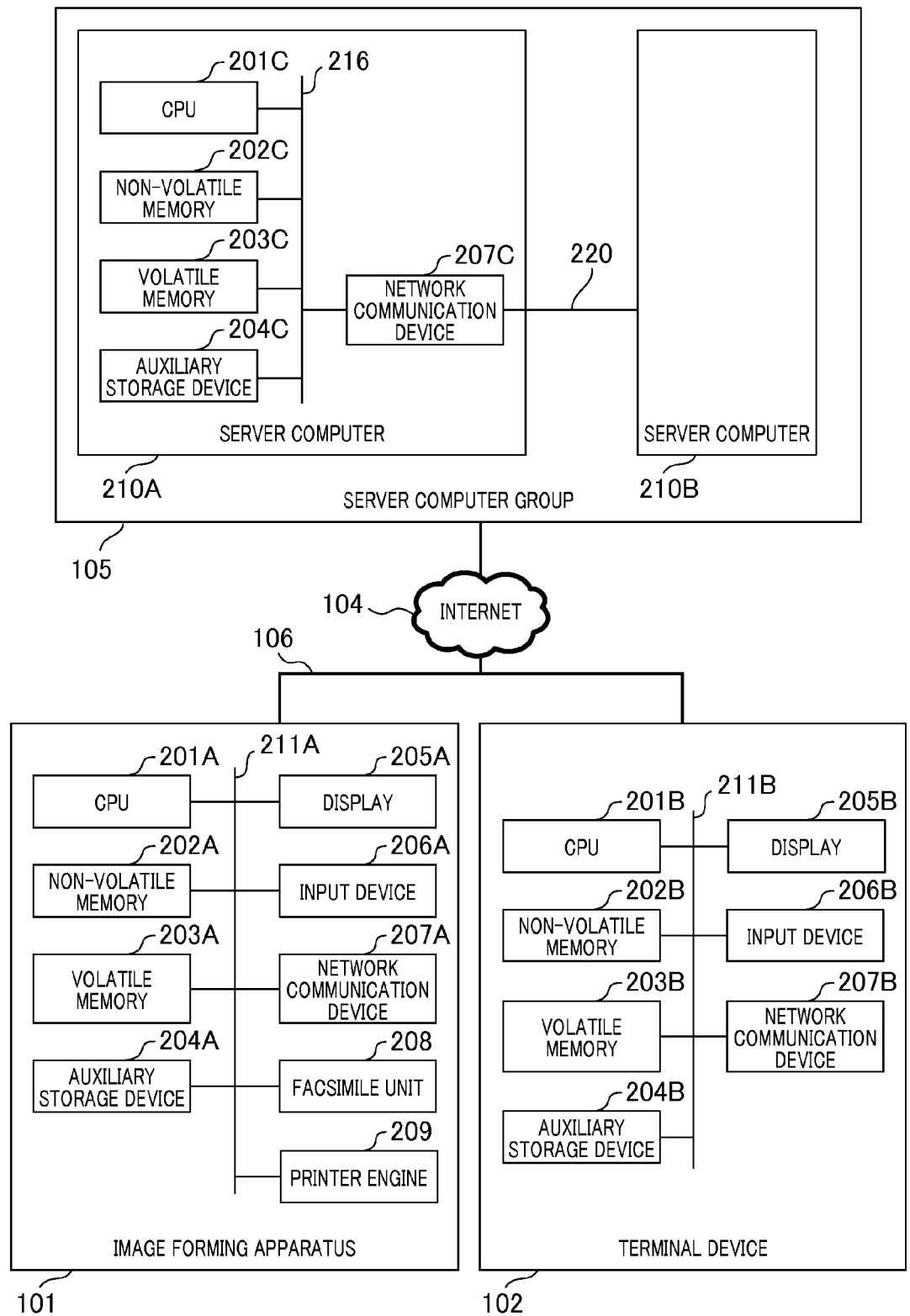
FIG. 2 is a diagram illustrating an example of the hardware configuration of an information processing system.

FIG. 2 is a diagram illustrating an example of the hardware configuration of the information processing system of the present embodiment. The server computer group 105 includes a server computer 210A and a server computer 210B. The server computer 210B has the same configuration as that of the server computer 210A. The server computer 210A and the server computer 210B communicate with each other via a network 220.

The server computer 210A includes a CPU 201C, a non-volatile memory 202C, a volatile memory 203C, an auxiliary storage device 204C, and a network communication device 207C that are connected to an internal bus 216. The image forming apparatus 101 includes a CPU 201A, a nonvolatile memory 202A, a volatile memory 203A, an auxiliary storage device 204A, a display 205A, an input device 206A, a network communication device 207A, a facsimile unit 208, and a printer engine 209 that are connected to an internal bus 211A. The terminal apparatus 102 includes a CPU 201B, a non-volatile memory 202B, a volatile memory 203B, an auxiliary storage device 204B, a display 205B, an input device 206B, and a network communication device 207B that are connected to an internal bus 211B.

In the following description, the CPU 201A, 201B, and 201C are also described as a CPU 201, the nonvolatile memories 202A, 202B, and 202C are also described as a non-volatile memory 202, the volatile memories 203A, 203B, and 203C are also described as a volatile memory 203, the auxiliary storage devices 204A, 204B, and 204C are also described as an auxiliary storage device 204, the displays 205A and 205B are also described as a display 205, the input devices 206A and 206B are also described as an input device 206, the network communication devices 207A and 207B are also described as a network communication device 207, and the internal buses 211A and 211B are also described as an internal bus 211.

The CPU (Central Processing Unit) 201 executes programs and controls various types of processing. The non-volatile memory 202 includes a ROM (Read Only Memory). The non-volatile memory 202 stores programs and data that is required for device start processing at the initial stage. The volatile memory 203 includes a RAM (Random Access Memory). The volatile memory 203 is used as a temporary storage location of the programs and data.

The auxiliary storage device 204 is a large-capacity storage device such as a hard disk, a RAM drive, or the like. The auxiliary storage device 204 stores large-capacity data and holds the execution code of the programs. The auxiliary storage device 204 stores data which needs to be held for a longer time than that of the volatile memory 203. The display 205 performs information display processing and notifies a user person of the resulting information. In the present embodiment, a user person denotes a user and a service person.

The input device 206 accepts a user person's selection instruction and transmits the instruction to a program via the internal bus 211. The network communication device 207 is a device that communicates with an external device via a network. The facsimile unit 208 is a hardware unit that transmits the image data formed by the image forming apparatus 101 or the image data stored in the auxiliary storage device 204A to an external device via the network 106. The facsimile unit 208 is optional and the image forming apparatus 101 may not include the facsimile unit 208. The printer engine 209 prints the image data formed by the image forming apparatus 101 or the image data stored in the auxiliary storage device 204A on a recording medium such as paper.

Figure 3:
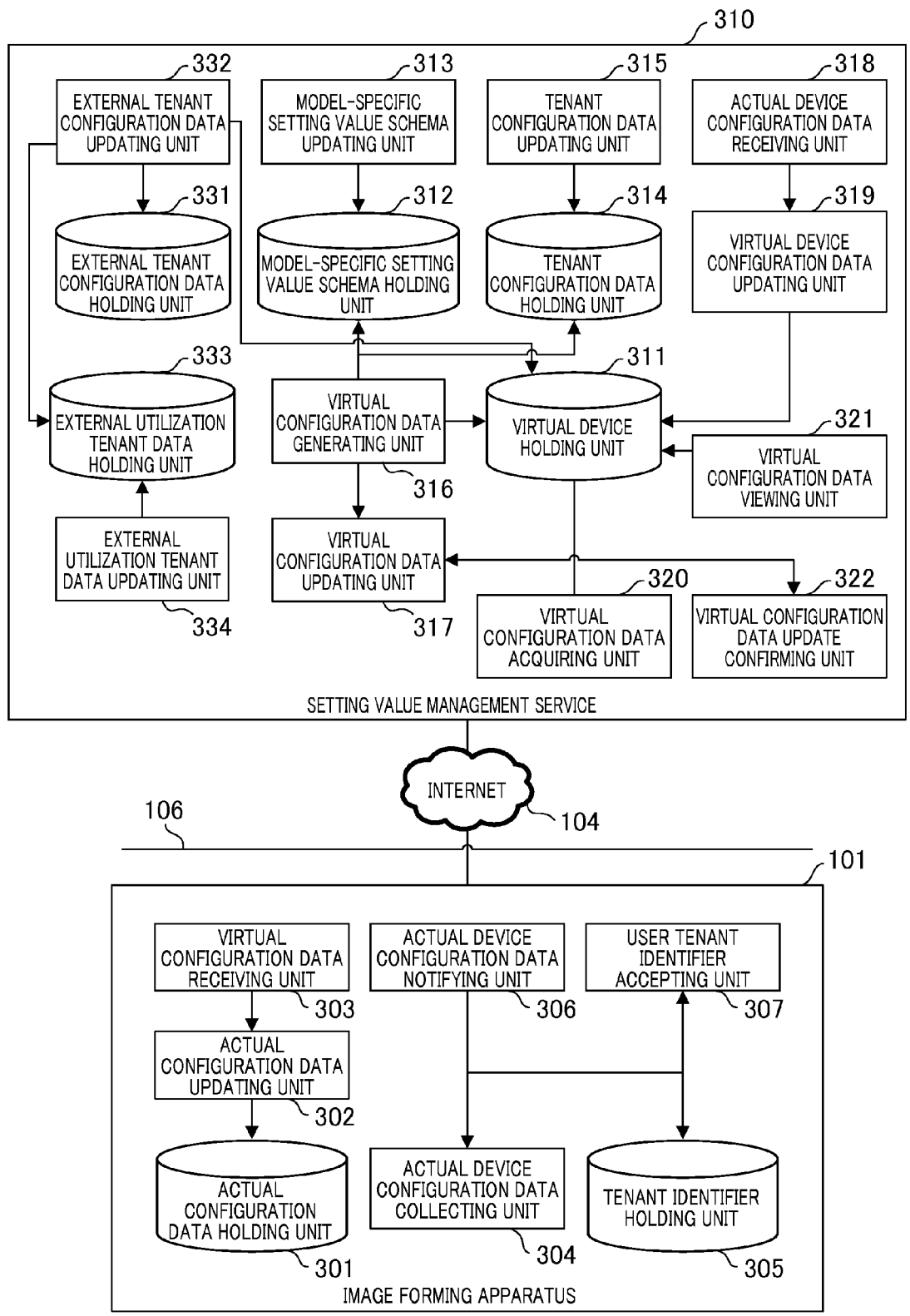
FIG. 3 is an exemplary functional block diagram illustrating the information processing system.

FIG. 3 is an exemplary functional block diagram illustrating the information processing system of the present embodiment. The information processing system shown in FIG. 3 includes an image forming apparatus 101 and a setting value management service 310. The image forming apparatus 101 and the setting value management service 310 communicate with each other via the Internet 104. The management method of the present embodiment is realized by the functions provided in the information processing system shown in FIG. 3.

The image forming apparatus 101 includes an actual configuration data holding unit 301, an actual configuration data updating unit 302, a virtual configuration data receiving unit 303, an actual device configuration data collecting unit 304, and a tenant identifier holding unit 305. Also, the image forming apparatus 101 includes an actual device configuration data notifying unit 306 and a user tenant identifier accepting unit 307.

The actual configuration data holding unit 301 holds configuration data for an image forming apparatus. More specifically, the actual configuration data holding unit 301 stores configuration data in the auxiliary storage device 204A for management. The image forming apparatus switches an operational behavior based on actual configuration data held by the actual configuration data holding unit 301.

The actual configuration data updating unit 302 updates actual configuration data held by the actual configuration data holding unit 301. More specifically, the actual configuration data updating unit 302 updates actual configuration data by replacing it with virtual configuration data acquired by the virtual configuration data receiving unit 303. The actual configuration data is applied to the image forming apparatus 101. In other words, the actual configuration data updating unit 302 functions as an applying unit that applies the virtual configuration data acquired by the virtual configuration data receiving unit 303 to the image forming apparatus 101.

The virtual configuration data receiving unit 303 acquires virtual configuration data from the virtual configuration data acquiring unit 320 provided in the setting value management service 310. The virtual configuration data receiving unit 303 calls the virtual configuration data acquiring unit 320 using an address which is set in the actual configuration data held by the actual configuration data holding unit 301.

FIGS. 4A to 4C are diagrams illustrating an example of actual configuration data. FIG. 4A shows actual configuration data for an image forming apparatus of which the device identifier is "010001". FIG. 4B shows actual configuration data for an image forming apparatus of which the device identifier is "010002". FIG. 4C shows actual configuration data for an image forming apparatus of which the device identifier is "020001". The device identifier is identification information for uniquely identifying an image forming apparatus.

Actual configuration data has data items including a setting value identifier 702 and a value 703. The setting value identifier 702 is an identifier for uniquely identifying a setting item. The value 703 is a value of a setting item. In the example shown in FIG. 4, http://ddd.com/config is set as the value (address) of "device_settings.cloud_address". The address is an address for a setting value management service which is set as the setting value management service for distributing configuration data to the image forming apparatus 101. Thus, the virtual configuration data receiving unit 303 described above accesses the address.

Note that virtual configuration data has the same data configuration as that of actual configuration data shown in FIG. 4. Thus, a description will be given of the actual configuration data shown in FIG. 4 as virtual configuration data as appropriate.

Referring back to FIG. 3, the actual device configuration data collecting unit 304 collects device configuration data (actual device configuration data) of the image forming apparatus 101.

Figure 5A:
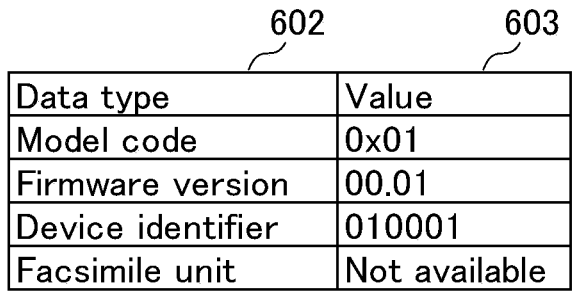
FIGS. 5A to 5C are diagrams illustrating an example of actual device configuration data.
Figure 5B:
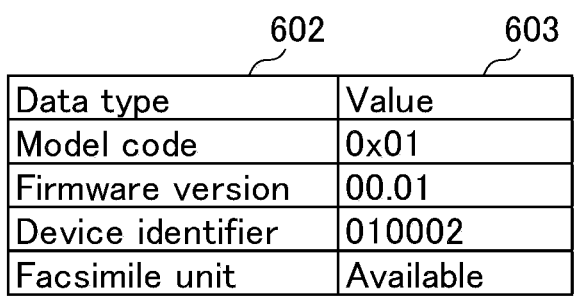
Figure 5C:
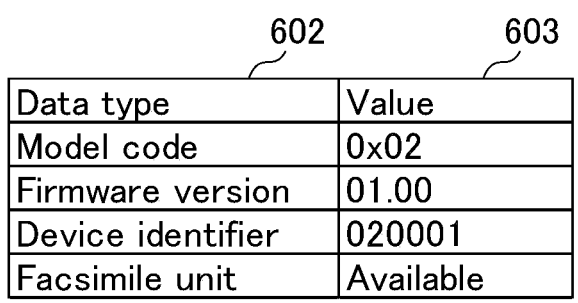

FIGS. 5A to 5C are diagrams illustrating an example of actual device configuration data. Each of FIGS. 5A, 5B, and 5C shows actual device configuration data for a different image forming apparatus. Actual device configuration data has data items including a data type 602 and a value 603. The data type 602 is the type of data included in actual device configuration data. A model code for identifying the model of an image forming apparatus, a firmware version, a device identifier for identifying a device, and the like are set to the data type 602. The value 603 is the value of data. A value (e.g., the value of a device identifier, the presence/absence of a facsimile unit, or the like) corresponding to the data type is set to the value 603. Note that virtual device configuration data has the same data configuration as that of actual device configuration data. Thus, a description will be given of the actual configuration data shown in FIG. 5 as virtual configuration data as appropriate.

Referring back to FIG. 3, the tenant identifier holding unit 305 holds a tenant identifier that is the identifier of a tenant to which the image forming apparatus 101 belongs. The tenant identifier is set upon initial installation of the image forming apparatus 101 and is stored in the auxiliary storage device 204A so as not to be lost even when the power is OFF.

The actual device configuration data notifying unit 306 notifies the actual device configuration data receiving unit 318 of the setting value management service 310 of the actual device configuration data collected by the actual device configuration data collecting unit 304 and the tenant identifier held by the tenant identifier holding unit 305. More specifically, the actual device configuration data notifying unit 306 transmits a configuration data generation request including the actual device configuration data and the tenant identifier to the actual device configuration data receiving unit 318. The configuration data generation request is a request (operation setting generation request) for generating virtual configuration data corresponding to the image forming apparatus 101. The user tenant identifier accepting unit 307 accepts an input of a user tenant identifier from a user. The user tenant identifier is the identifier of a tenant to which a user belongs.

The setting value management service 310 includes a virtual device holding unit 311, a model-specific setting value schema holding unit 312, a model-specific setting value schema updating unit 313, a tenant configuration data holding unit 314, and a tenant configuration data updating unit 315.

Also, the setting value management service 310 includes a virtual configuration data generating unit 316, a virtual configuration data updating unit 317, an actual device configuration data receiving unit 318, and a virtual device configuration data updating unit 319. Further, the setting value management service 310 includes a virtual configuration data acquiring unit 320, a virtual configuration data viewing unit 321, and a virtual configuration data update confirming unit 322. Furthermore, the setting value management service 310 includes an external tenant configuration data holding unit 331, an external tenant configuration data updating unit 332, an external use tenant data holding unit 333, and an external use tenant data updating unit 334.

The virtual device holding unit 311 holds a virtual device. The virtual device includes at least virtual device configuration data, virtual configuration data, a device identifier, a tenant identifier, and an external use tenant identifier. The virtual device holding unit 311 stores the virtual device in the auxiliary storage device 204C for management.

FIG. 6 is a diagram illustrating an exemplary virtual device. The virtual device shown in FIG. 6 has a device identifier 802, a tenant identifier 803, an external use tenant identifier 804, a virtual device configuration data 805, a virtual configuration data 806, and a notification flag 807. The device identifier 802 is identification information for uniquely identifying a virtual device. The device identifier 802 corresponds to identification information for uniquely identifying the image forming apparatus 101 corresponding to the virtual device. The device identifier 802 is included in device configuration data which is notified by the image forming apparatus 101 to the setting value management service 310.

The tenant identifier 803 is identification information for uniquely identifying a tenant to which the image forming apparatus 101 corresponding to the virtual device belongs. The external use tenant identifier 804 is identification information for uniquely identifying a use tenant.

Among the records (data in one row) of the virtual device shown in FIG. 6, the tenant identifier 803 included in a record in which data is set in the external use tenant identifier 804 is an identifier for uniquely identifying a tenant to be used. The tenant to be used is a tenant that provides a device to a user who belongs to an external tenant. Also, in the record, the external use tenant identifier 804 associated with the tenant identifier 803 is an identifier for uniquely identifying a use tenant. The use tenant is a tenant that receives the provision of a device from a tenant to be used. In other words, the use tenant is another tenant different from a tenant to be used and is a tenant to which a user belongs who has been authorized the use of the image forming apparatus 101 indicated by a device identifier included in the records of the virtual device.

The virtual device configuration data 805 is identification information for uniquely identifying virtual device configuration data. Virtual device configuration data corresponds to device configuration data (actual device configuration data) of the image forming apparatus 101 corresponding to the virtual device. The virtual configuration data 806 is identification information for uniquely identifying virtual configuration data. Virtual configuration data corresponds to configuration data (actual configuration data) of the image forming apparatus 101 corresponding to the virtual device.

The notification flag 807 indicates whether or not the image forming apparatus has already been notified about the virtual configuration data 806. The flag "notnotified" set in the notification flag 807 indicates that the image forming apparatus has not been notified about the virtual configuration data 806. The flag "notified" set in the notification flag 807 indicates that the image forming apparatus has already been notified about the virtual configuration data 806.

Referring back to FIG. 3, the model-specific setting value schema holding unit 312 holds the model-specific setting value schema. One model-specific setting value schema is prepared corresponding to each model of image forming apparatuses.

FIGS. 7A and 7B are diagrams illustrating an exemplary model-specific setting value schema. FIG. 7A shows a model-specific setting value schema corresponding to the model code of 0x01. FIG. 7B shows a model-specific setting value schema corresponding to the model code of 0x02. The model-specific setting value schema has data items including a setting value identifier 402, a default value 403, a value range 404, and a condition 405.

The setting value identifier 402 is identification information for uniquely identifying a setting item. For example, the setting value identifier "copy_settings.nup" indicates a setting item relating to imposition in copy settings. If the setting value identifiers 402 are identical, it indicates the fact that the setting items are identical in spite of different models. The default value 403 is a default set value for the model. The value range 404 is a definition of a range which can be set in the model. For example, the value range 404 of the setting value identifier "copy_settings.nup" indicates that the value range can be selected from three types of copy settings "1 in 1, 2 in 1, and 4 in 1" in the model.

The condition 405 is a definition of the conditions necessary for using set values in the model. The condition "facsimile unit" is set in the condition 405 corresponding to the setting item of "fax_settings.received_print". Thus, the set value for the setting item becomes valid only when mounting of a facsimile unit is confirmed.

Referring back to FIG. 3, the model-specific setting value schema updating unit 313 updates the model-specific setting value schema held by the model-specific setting value schema holding unit 312. For example, when a vendor of the image forming apparatus releases a new model, a model-specific setting value schema corresponding to the new model is registered in accordance with the instruction given by the administrator of the vendor. If any setting item is changed, the model-specific setting value schema updating unit 313 updates the model-specific setting value schema.

The tenant configuration data holding unit 314 holds configuration data that a tenant would like to set to an image forming apparatus. More specifically, the tenant configuration data holding unit 314 functions as a first holding unit that holds tenant configuration data (first operation setting information) which is applied to the image forming apparatus 101 belonging to a first management range managed by the setting value management service 310.

FIG. 8 is a diagram illustrating an example of tenant configuration data. Tenant configuration data has data items including a setting value identifier 502 and a value 503. The setting value identifier 502 is the same as the setting value identifier 402 included in the model-specific setting value schema shown in FIG. 7. The value 503 is a common setting value desired by a tenant. The copy setting "2 in 1" is set in the setting value identifier "copy_settings.nup". This indicates that the user desires that the copy setting "2 in 1" be set in all image forming apparatuses held by a tenant.

Referring back to FIG. 3, the tenant configuration data updating unit 315 updates tenant configuration data held by the tenant configuration data holding unit 314. In accordance with the operation by a service person who manages image forming apparatuses held by a tenant, the terminal apparatus 102B in the service person environment 110 provides an update instruction for tenant configuration data. The tenant configuration data updating unit 315 updates tenant configuration data in accordance with the update instruction. Note that the service person performs operation on a setting screen which is displayed on a web browser running on the terminal apparatus 102B.

The virtual configuration data generating unit 316 generates virtual configuration data based on the model-specific setting value schema, tenant configuration data, and virtual device configuration data. Firstly, the virtual configuration data generating unit 316 acquires virtual device configuration data shown in FIG. 5A from the virtual device holding unit 311.

Next, the virtual configuration data generating unit 316 refers to a model code included in the acquired virtual device configuration data to thereby specify the model of the image forming apparatus. Using the virtual device configuration data shown in FIG. 5A as an example, 0x01 is set as a value corresponding to the model code. Thus, the virtual configuration data generating unit 316 specifies the model of the image forming apparatus having the model code of 0x01.

Next, the virtual configuration data generating unit 316 acquires a model-specific setting value schema corresponding to the specified model code from the model-specific setting value schema holding unit 312. The virtual configuration data generating unit 316 acquires, for example, the model-specific setting value schema shown in FIG. 7A, of which the model code matches 0x01.

Next, the virtual configuration data generating unit 316 generates virtual configuration data based on the set values defined in the acquired model-specific setting value schema. Using the model-specific setting value schema shown in FIG. 7A as an example, the virtual configuration data generating unit 316 generates virtual configuration data based on set values corresponding to five setting items "copy_settings.nup", "device_settings.cloud_address", "device_settings.sleep_time", "fax_settings.received_print", and "box_settings.server_address".

Next, the virtual configuration data generating unit 316 acquires tenant configuration data shown in FIG. 8 from the tenant configuration data holding unit 314. The virtual configuration data generating unit 316 determines whether or not the set value included in tenant configuration data falls within the value range defined in the model-specific setting value schema.

A description will be given by taking an example of tenant configuration data shown in FIG. 8 and model-specific setting value schema shown in FIG. 7A. The value (set value) for the setting item "copy_settings.nup" included in tenant configuration data is "2 in 1". On the other hand, the value range corresponding to the setting item, which is defined in the model-specific setting value schema, is "1 in 1, 2 in 1, and 4 in 1". Thus, the set value included in tenant configuration data falls within the value range defined in the model-specific setting value schema.

The value (set value) for the setting item "device_settings.sleep_time" included in tenant configuration data is "10 seconds". On the other hand, the value range corresponding to the setting item, which is defined in the model-specific setting value schema, is "1 minute, 10 minutes, and 1 hour". Thus, the set value included in tenant configuration data does not fall within the value range defined in the model-specific setting value schema. When the set value included in tenant configuration data does not fall within the value range defined in the model-specific setting value schema, the virtual configuration data generating unit 316 acquires the default value defined in the model-specific setting value schema. In this example, the default value "10 minutes" is acquired. The virtual configuration data generating unit 316 uses the acquired default value as the set value for the setting item in virtual configuration data.

When the set value included in tenant configuration data falls within the value range defined in the model-specific setting value schema, the virtual configuration data generating unit 316 takes the set value included in tenant configuration data as the set value corresponding to the setting item of virtual configuration data.

Next, the virtual configuration data generating unit 316 determines whether or not virtual device configuration data satisfies the condition defined in the model-specific setting value schema. Referring to the model-specific setting value schema shown in FIG. 7A, there is no particular condition corresponding to "copy_settings.nup". Thus, virtual device configuration data shown in FIG. 5A satisfies the condition corresponding to "copy_settings.nup".

However, the condition corresponding to "fax_settings.received_print" is "facsimile unit", whereas the value "none" is set as a value for "facsimile unit" included in virtual device configuration data. Thus, virtual device configuration data does not satisfy the condition corresponding to the setting item.

When virtual device configuration data does not satisfy the condition defined in the model-specific setting value schema, the virtual configuration data generating unit 316 acquires the default value 403 defined in the model-specific setting value schema. In this example, the virtual configuration data generating unit 316 acquires a default value "OFF" corresponding to "fax_settings.received_print". The virtual configuration data generating unit 316 uses the acquired default value as the set value for the setting item in virtual configuration data.

Referring back to FIG. 3, the virtual configuration data updating unit 317 updates virtual configuration data in the virtual device held by the virtual device holding unit 311 with virtual configuration data generated by the virtual configuration data generating unit 316.

More specifically, among the virtual devices held by the virtual device holding unit 311, the virtual configuration data updating unit 317 acquires a virtual device having a device identifier corresponding to the generated virtual configuration data. Then, the virtual configuration data updating unit 317 updates virtual configuration data in the acquired virtual device with the generated virtual configuration data.

Furthermore, when the notification flag 807 for the virtual device is "notified", the virtual configuration data updating unit 317 sets the notification flag 807 to "not-notified". Setting the notification flag 807 to "not-notified" means that virtual configuration data corresponding to an image forming apparatus is changed so that the image forming apparatus needs to refer to new virtual configuration data. The actual device configuration data receiving unit 318 receives device configuration data (FIG. 5) and a tenant identifier from the actual device configuration data notifying unit 306 provided in the image forming apparatus 101.

The virtual device configuration data updating unit 319 updates virtual device configuration data in the virtual device held by the virtual device holding unit 311 with device configuration data received by the actual device configuration data receiving unit 318. More specifically, among the virtual devices held by the virtual device holding unit 311, the virtual device configuration data updating unit 319 acquires a virtual device having a device identifier that is set in device configuration data received by the actual device configuration data receiving unit 318. Then, the virtual device configuration data updating unit 319 updates virtual device configuration data in the acquired virtual device with device configuration data received by the actual device configuration data receiving unit 318.

The virtual configuration data acquiring unit 320 receives a virtual configuration data acquisition request from the virtual configuration data receiving unit 303 provided in the image forming apparatus 101 via the Internet 104 to thereby acquire virtual configuration data from the virtual device holding unit 311.

The virtual configuration data acquisition request includes at least a device identifier for specifying a virtual device. Thus, the virtual configuration data acquiring unit 320 searches for a virtual device having a device identifier included in the virtual configuration data acquisition request. The virtual configuration data acquiring unit 320 acquires virtual configuration data in the searched virtual device. Then, the virtual configuration data acquiring unit 320 passes the acquired virtual configuration data to the request source, i.e., the virtual configuration data receiving unit 303 via the Internet 104.

The virtual configuration data viewing unit 321 receives a configuration data viewing request from an external device via the Internet 104. The configuration data viewing request is a request on/using an HTTP protocol. The virtual configuration data viewing unit 321 acquires virtual configuration data corresponding to the viewing request and generates a HTML page for viewing for the acquired virtual configuration data to return the HTML page for viewing to the request source.

The virtual configuration data update confirming unit 322 confirms whether or not virtual configuration data has been updated. More specifically, the virtual configuration data receiving unit 303 provided in the image forming apparatus 101 transmits the device identifier of the image forming apparatus 101 to the virtual configuration data update confirming unit 322 via the Internet 104. The virtual configuration data update confirming unit 322 searches a virtual device having the received device identifier from the virtual devices held by the virtual device holding unit 311. The virtual configuration data update confirming unit 322 refers to the notification flag 807 for the searched virtual device.

When the notification flag 807 is "notnotified", the virtual configuration data update confirming unit 322 determines that virtual configuration data has been updated. When the notification flag 807 is "notified", the virtual configuration data update confirming unit 322 determines that virtual configuration data has not been updated. The virtual configuration data update confirming unit 322 returns the update status of the virtual configuration data to the virtual configuration data receiving unit 303. Then, the virtual configuration data receiving unit 303 that has confirmed the update of virtual configuration data makes a configuration data acquisition request to the virtual configuration data acquiring unit 320 of the setting value management service 310.

The virtual configuration data update confirming unit 322 may also confirm whether or not virtual configuration data has been updated using the update of virtual configuration data by the virtual configuration data updating unit 317 as a trigger. Then, when the virtual configuration data update confirming unit 322 confirms that virtual configuration data has been updated, the virtual configuration data acquiring unit 320 may also acquire configuration data and transmit it to virtual configuration data in the image forming apparatus 101.

The external tenant configuration data holding unit 331 holds external tenant configuration data. In other words, the external tenant configuration data holding unit 331 functions as a second holding unit that holds second operation setting information which is commonly applied to the image forming apparatus 101 belonging to a second management range managed by the setting value management service 310. The external tenant configuration data updating unit 332 receives an external use tenant configuration data update request from the terminal apparatus 102 operated by the administrator of a tenant to be used or the administrator of a use tenant. Then, the external tenant configuration data updating unit 332 updates external tenant configuration data held by the external tenant configuration data holding unit 331 in accordance with the received update request.

Figure 9A:
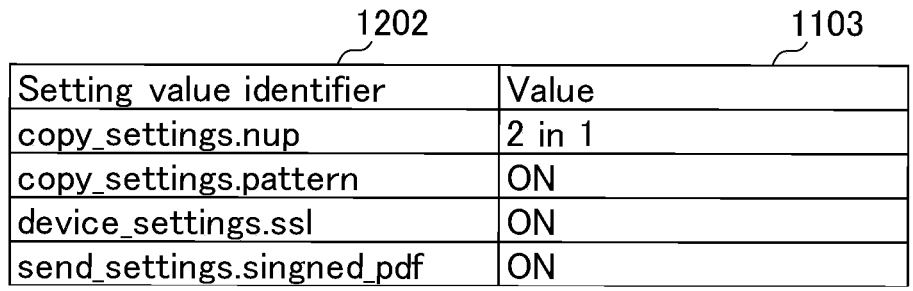
FIGS. 9A and 9B are diagrams illustrating an example of external tenant configuration data.
Figure 9B:
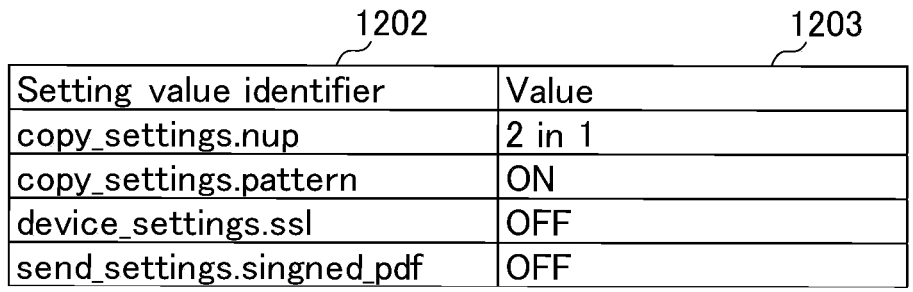

FIGS. 9A and 9B are diagrams illustrating an example of external tenant configuration data. FIG. 9A shows external tenant configuration data which is commonly used for the image forming apparatuses belonging to an external tenant. FIG. 9B shows external tenant configuration data which is commonly used for the image forming apparatuses belonging to another external tenant. External tenant configuration data is associated with the identifier of a tenant that uses external tenant configuration data, i.e., a use tenant (a use tenant identifier) and the identifier of a tenant to be used (a used-tenant identifier).

External tenant configuration data has data items including a setting value identifier 1202 and a value 1103. The setting value identifier 1202 is the same as the setting value identifier 502 included in tenant configuration data shown in FIG. 8. The value 1103 is a value for setting which is commonly used for image forming apparatuses belonging to an external tenant.

The external use tenant data holding unit 333 holds external use tenant data. Tenant data for external use is correspondence information between a tenant to be used and a use tenant which has been authorized to use the tenant to be used.

Figure 10:
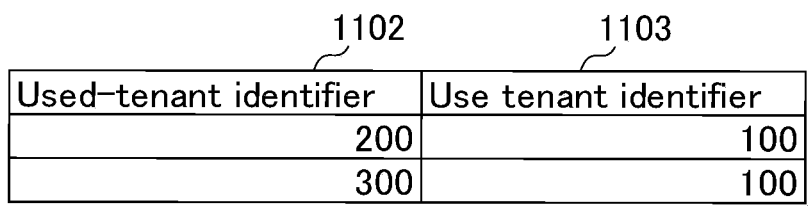
FIG. 10 is a diagram illustrating an example of external use tenant data.

FIG. 10 is a diagram illustrating an example of external use tenant data. Tenant data for external use has data items including a used-tenant identifier 1102 and a use tenant identifier 1103. The used-tenant identifier 1102 is identification information for uniquely identifying a tenant to be used. The use tenant identifier 1103 is identification information for uniquely identifying a use tenant which has been authorized to use the tenant to be used. In other words, the external use tenant data holding unit 333 functions as an authorized tenant storage unit that stores authorized tenant information in advance. Authorized tenant information is correspondence information between identification information about a tenant to be used managed by the setting value management service 310 and identification information about a tenant (a use tenant) corresponding to a user to whom the setting value management service 310 permits the use of the image forming apparatus 101 belonging to the tenant to be used.

Referring back to FIG. 3, the external use tenant data updating unit 334 receives an external use tenant data update request from the terminal apparatus 102 operated by the administrator of the tenant to be used. Then, the external use tenant data updating unit 334 updates external use tenant data held by the external use tenant data holding unit 333 in accordance with the received update request.

Figure 11:
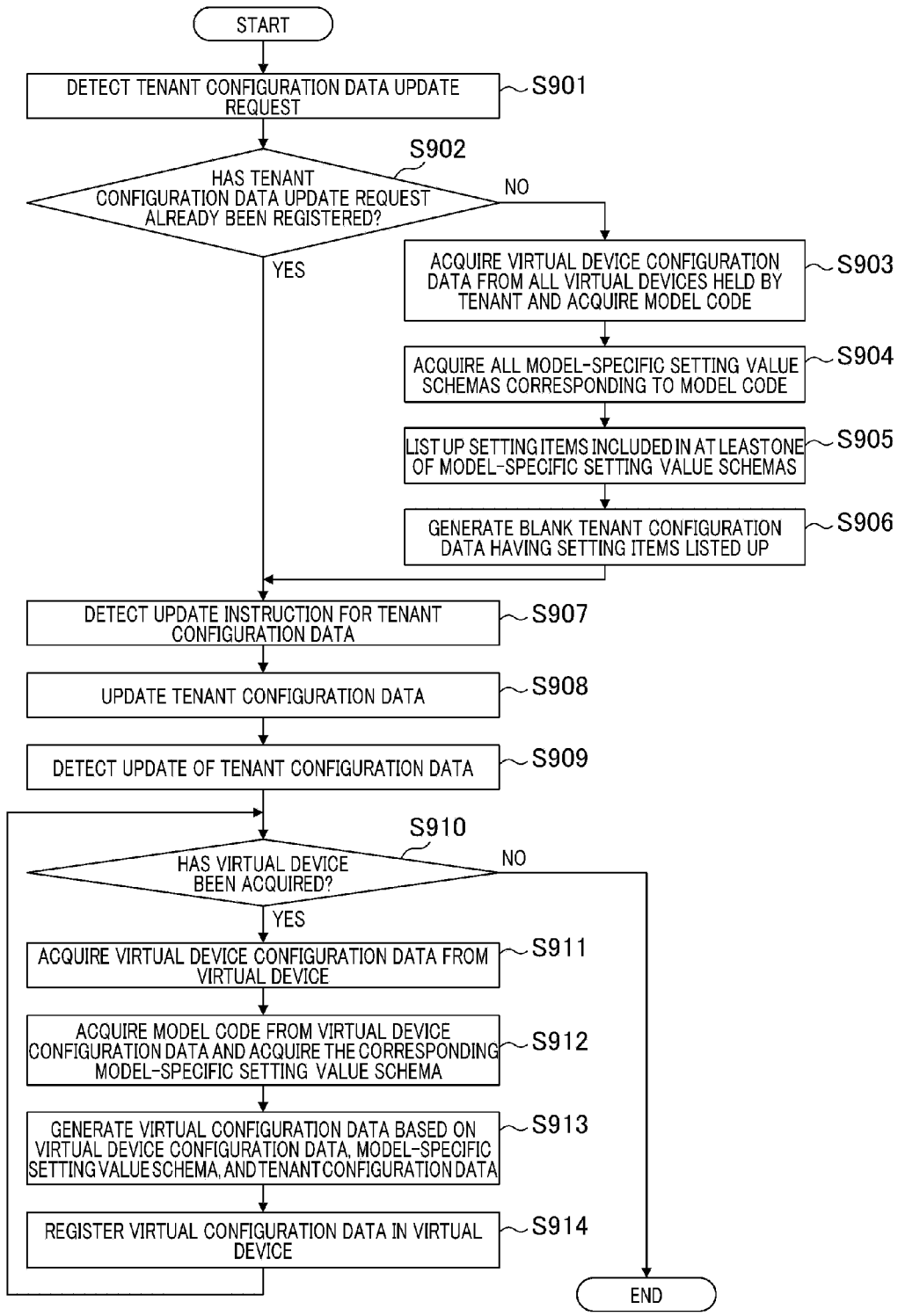
FIG. 11 is an exemplary flowchart illustrating processing for updating tenant configuration data.

FIG. 11 is an exemplary flowchart illustrating processing for updating tenant configuration data. In this example, an administrator user updates tenant configuration data using the terminal apparatus 102A. A program for executing the processes in steps of the flowchart shown in FIG. 11 is stored in anyone of the storage units that are the non-volatile memory 202C, the volatile memory 203C, and the auxiliary storage device 204C and is executed by the CPU 201C.

Firstly, the tenant configuration data updating unit 315 detects a tenant configuration data update request transmitted from the terminal apparatus 102A (step S901). Next, the tenant configuration data updating unit 315 confirms whether or not tenant configuration data corresponding to the tenant configuration data update request has already been registered to the tenant configuration data holding unit 314 (step S902). When tenant configuration data corresponding to the tenant configuration data update request has already been registered, the process advances to step S907. When tenant configuration data corresponding to the tenant configuration data update request has not yet been registered, the process advances to step S903.

In step S903, the tenant configuration data updating unit 315 acquires a virtual device held by a tenant from the virtual device holding unit 311. The tenant configuration data updating unit 315 acquires virtual device configuration data included in the acquired virtual device. Then, the tenant configuration data updating unit 315 acquires a model code included in the acquired virtual device configuration data (step S903).

Next, the tenant configuration data updating unit 315 acquires model-specific setting value schemas corresponding to the acquired model code from the model-specific setting value schema holding unit 312 (step S904). Next, the tenant configuration data updating unit 315 lists the setting items included in at least one of the model-specific setting value schemas acquired in step S904 (step S905). Then, the tenant configuration data updating unit 315 generates blank tenant configuration data having the setting items listed up in step S905 (step S906), and the process advances to step S907.

In step S907, the tenant configuration data updating unit 315 detects a specific update instruction for tenant configuration data (step S907). Then, the tenant configuration data updating unit 315 updates tenant configuration data based on the update instruction detected in step S907 (step S908). The tenant configuration data holding unit 314 stores the updated tenant configuration data.

Next, the virtual configuration data generating unit 316 detects that tenant configuration data has been updated (step S909). Then, the virtual configuration data generating unit 316 searches a virtual device, of which the tenant identifier matches the tenant identifier of tenant configuration data of which an update has been detected, from the virtual devices held by the virtual device holding unit 311. In order to perform processing for the searched virtual devices in sequence, the virtual configuration data generating unit 316 acquires one virtual device. The virtual configuration data generating unit 316 determines whether or not the virtual device is successively acquired (step S910). When processing for all virtual devices is performed in sequence and the next virtual device cannot be acquired, the process ends. When the virtual configuration data generating unit 316 successively acquires the next virtual device, the process advances to step S911.

In step S911, the virtual configuration data generating unit 316 acquires virtual device configuration data from a virtual device to be processed (step S911). Next, the virtual configuration data generating unit 316 acquires a model code from virtual device configuration data acquired in step S911. Then, the virtual configuration data generating unit 316 acquires a model-specific setting value schema corresponding to the acquired model code from the model-specific setting value schema holding unit 312 (step S912).

Next, the virtual configuration data generating unit 316 generates virtual configuration data based on the virtual device configuration data, model-specific setting value schema, and tenant configuration data (step S913). Then, the virtual configuration data updating unit 317 registers the generated virtual configuration data in the virtual device (step S914), and the process returns to step S910. Through the process in step S914, the updated tenant configuration data is reflected in the virtual device.

As seen from the description with reference to FIG. 11, the tenant configuration data updating unit 315 executes the following processing using the update of tenant configuration data as a trigger. The tenant configuration data updating unit 315 generates virtual configuration data which is applied to the image forming apparatus 101, when a user who corresponds to the first management range uses the image forming apparatus 101 belonging to the first management range, using the updated tenant configuration data. The virtual configuration data updating unit 317 stores device information including correspondence information among virtual configuration data, information (tenant identifier) regarding the first management range, and configuration information (virtual device configuration data) about the devices provided in an image forming apparatus belonging to the first management range in the storage unit.

Figure 12:
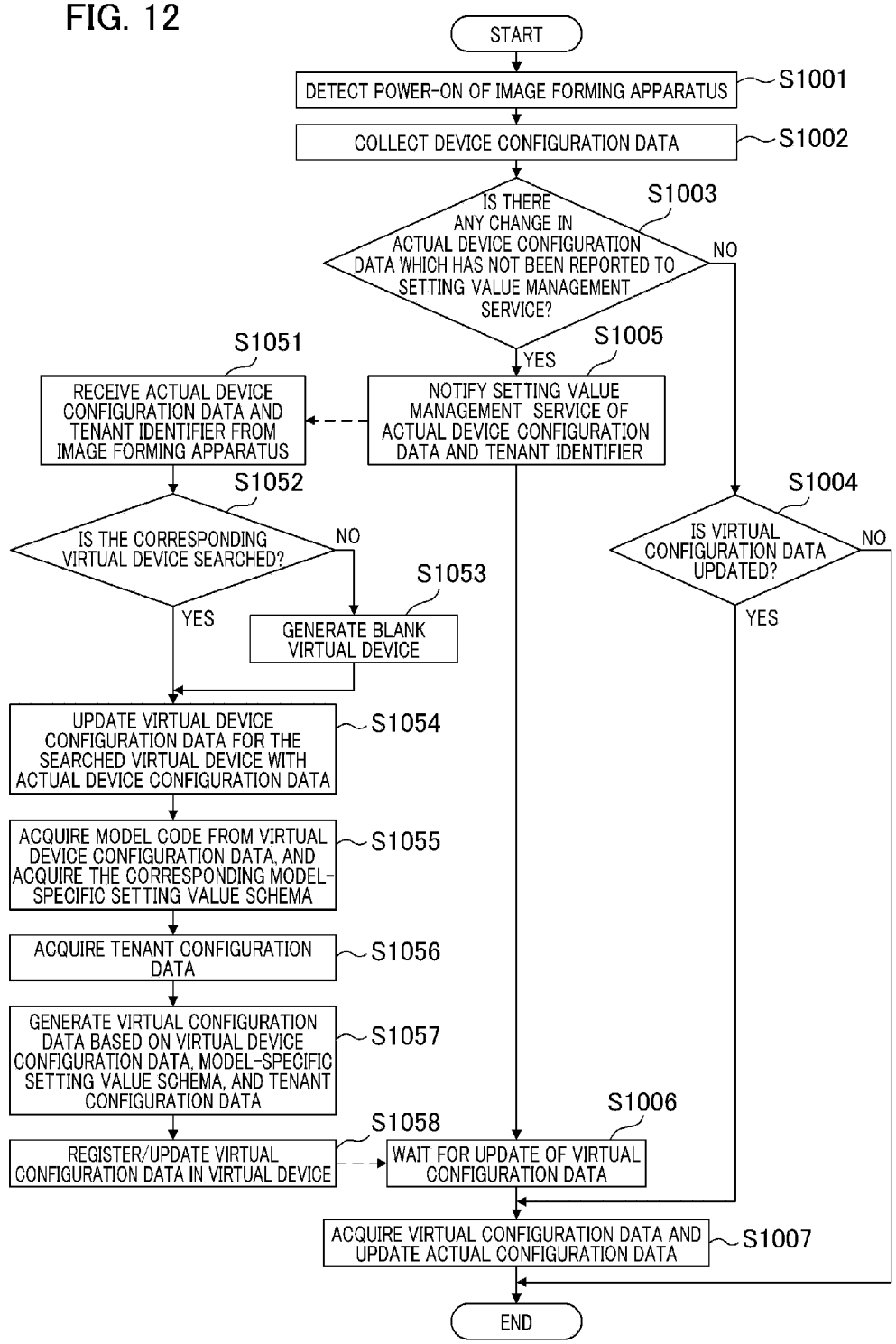
FIG. 12 is a flowchart illustrating processing for acquiring virtual configuration data by an image forming apparatus.

FIG. 12 is an exemplary flowchart illustrating processing for acquiring virtual configuration data by an image forming apparatus. The processes to be described with reference to FIG. 12 correspond to the use of configuration data closed in one tenant. The processes in steps S1001 to S1007 shown in FIG. 12 are executed by an image forming apparatus. A program for executing the processes in steps of the flowchart shown in FIG. 12 is stored in any one of the storage units that are the non-volatile memory 202A, the volatile memory 203A, and the auxiliary storage device 204A and is executed by the CPU 201A. Also, the processes in steps S1051 to S1058 shown in FIG. 12 are executed by the server computer group 105. A program for executing the processes in steps of the flowchart shown in FIG. 12 is stored in anyone of the storage units that are the non-volatile memory 202C, the volatile memory 203C, and the auxiliary storage device 204C, and is executed by the CPU 201C.

Firstly, the actual device configuration data notifying unit 306 of the image forming apparatus 101 detects the power-ON of the image forming apparatus 101 (step S1001). Next, the actual device configuration data collecting unit 304 collects device configuration data (step S1002).

Next, the actual device configuration data notifying unit 306 functions as a configuration change determining unit that determines whether there is any change in configuration information about the devices provided in the image forming apparatus 101. More specifically, the actual device configuration data notifying unit 306 determines whether there is any change in actual device configuration data, which has not been reported to the setting value management service 310, based on actual device configuration data collected in step S1002 (step S1003).

If there is any change in actual device configuration data which has not been reported, the process advances to step S1005. If there is no change in actual device configuration data which has not been reported, the process advances to step S1004. When a new device is installed, the process advances to step S1005.

In step S1004, the virtual configuration data receiving unit 303 determines whether or not the device has already acquired the latest virtual configuration data, that is, the virtual configuration data has already been updated (step S1004). More specifically, the virtual configuration data receiving unit 303 confirms with the virtual configuration data update confirming unit 322 of the setting value management service 310 via the Internet 104 whether or not virtual configuration data has been updated. The virtual configuration data receiving unit 303 determines whether or not virtual configuration data has been updated based on the confirmation result. If virtual configuration data has not been updated, the process ends. If virtual configuration data has been updated, the process advances to step S1007.

In step S1005, the actual device configuration data notifying unit 306 notifies the setting value management service 310 about a configuration data generation request including actual device configuration data and the tenant identifier (step S1005). In other words, the actual device configuration data notifying unit 306 functions as a requesting unit that transmits a configuration data generation request including configuration information about the devices provided in the image forming apparatus 101 and information (tenant identifier) regarding the management range of a user who uses the image forming apparatus 101. The notification destination address is an address held by the actual configuration data holding unit 301.

In step S1051, the setting value management service 310 detects the notification and then perform processing. A detailed description of processing executed by the setting value management service 310 will be given below.

Next, the virtual configuration data receiving unit 303 waits for the execution of the processing until the update of virtual configuration data is completed (step S1006). Next, the virtual configuration data receiving unit 303 receives virtual configuration data from the setting value management service 310. In other words, the virtual configuration data receiving unit 303 functions as an acquiring unit that executes the following processing. The virtual configuration data receiving unit 303 acquires operation setting information corresponding to the image forming apparatus 101 as a response to the configuration data generation request from the setting value management service 310 that has generated (updated) virtual configuration data in response to the configuration data generation request. Then, the virtual configuration data updating unit 317 updates the received virtual configuration data as actual configuration data (step S1007). Actual configuration data is stored by the actual configuration data holding unit 301.

In step S1051, the actual device configuration data receiving unit 318 of the setting value management service 310 accepts the configuration data generation request including actual device configuration data and the tenant identifier from the image forming apparatus 101 (step S1051).

Next, among the virtual devices held by the virtual device holding unit 311, the virtual device configuration data updating unit 319 searches for a virtual device that matches the actual device configuration data and the tenant identifier both included in the configuration data generation request received in S1051 (step S1054). If the matched virtual device has been found, the process advances to step S1054. If the matched virtual device has not been found, the process advances to step S1053. When an image forming apparatus communicates with the setting value management service 310 for the first time upon installation of a new device, there may be cases where searching for a virtual device is not possible. Thus, in this case, the process advances to step S1053.

In step S1053, the virtual device configuration data updating unit 319 generates a blank virtual device (step S1053), and the process advances to step S1054. Next, the virtual device configuration data updating unit 319 updates virtual device configuration data for the virtual device searched in S1052 with actual device configuration data included in the configuration data generation request received in step S1051 (step S1054). Also, the virtual device configuration data updating unit 319 sets actual device configuration data included in the configuration data generation request received in step S1051 as virtual device configuration data for the virtual device generated in step S1053. With this arrangement, the virtual device corresponding to the image forming apparatus 101 is updated.

Next, the virtual configuration data generating unit 316 acquires a model code from virtual device configuration data updated in step S1056. Then, the virtual configuration data generating unit 316 acquires a model-specific setting value schema corresponding to the acquired model code from the model-specific setting value schema holding unit 312 (step S1055).

Next, the virtual configuration data generating unit 316 acquires tenant configuration data (step S1056). More specifically, the virtual configuration data generating unit 316 acquires tenant configuration data corresponding to the tenant identifier received in step S1051 from tenant configuration data held by the tenant configuration data holding unit 314.

Next, the virtual configuration data generating unit 316 generates virtual configuration data based on the virtual device configuration data, model-specific setting value schema, and tenant configuration data (step S1057). The process in step S1057 is the same as that in step S913 shown in FIG. 11. In other words, the virtual configuration data generating unit 316 generates configuration data corresponding to the image forming apparatus 101 based on configuration information (device configuration data) included in the configuration data generation request.

Next, the virtual configuration data updating unit 317 updates the generated virtual configuration data by registering it in the virtual device in question (step S1058). In step S1058, the virtual configuration data acquiring unit 320 further transmits the generated virtual configuration data to the virtual configuration data receiving unit 303 of the image forming apparatus 101.

Next, a description will be given of the use of configuration data across a plurality of tenants. The use of configuration data across a plurality of tenants is that the image forming apparatus acquires configuration data corresponding thereto from the setting value management service 310 and applies the configuration data thereto when a user uses an image forming apparatus in another tenant which is different from a tenant to which he/she belongs. In the following description, the use of an image forming apparatus in a tenant to be used by a user who belongs to a use tenant will be simply referred to as "the use of a tenant to be used".

The use of configuration data across a plurality of tenants is executed by the following procedure. Firstly, a trust relationship is established between a tenant to be used and a use tenant. More specifically, the setting value management service 310 sets (updates) external use tenant data in accordance with a request from the terminal apparatus 102 which is operated by the administrator of a tenant to be used or the administrator of a use tenant. Processing for updating external use tenant data will be described below with reference to FIG. 13.

Next, the setting value management service 310 generates virtual configuration data corresponding to an image forming apparatus belonging to the tenant to be used using external tenant configuration data and the virtual device. In the present embodiment, the setting value management service 310 manages external tenant configuration data as information belonging to a use tenant. Then, the setting value management service 310 generates virtual configuration data using external tenant configuration data, and updates the virtual device with the generated virtual configuration data. Processing for generating virtual configuration data using external tenant configuration data will be described below with reference to FIG. 14.

Finally, the image forming apparatus acquires virtual configuration data from the setting value management service 310, and updates the actual configuration data of the image forming apparatus using the acquired virtual configuration data. In the present embodiment, when a user belonging to a use tenant uses an image forming apparatus belonging to a tenant to be used, virtual configuration data is automatically acquired and actual configuration data is automatically updated as well.

Figure 13:
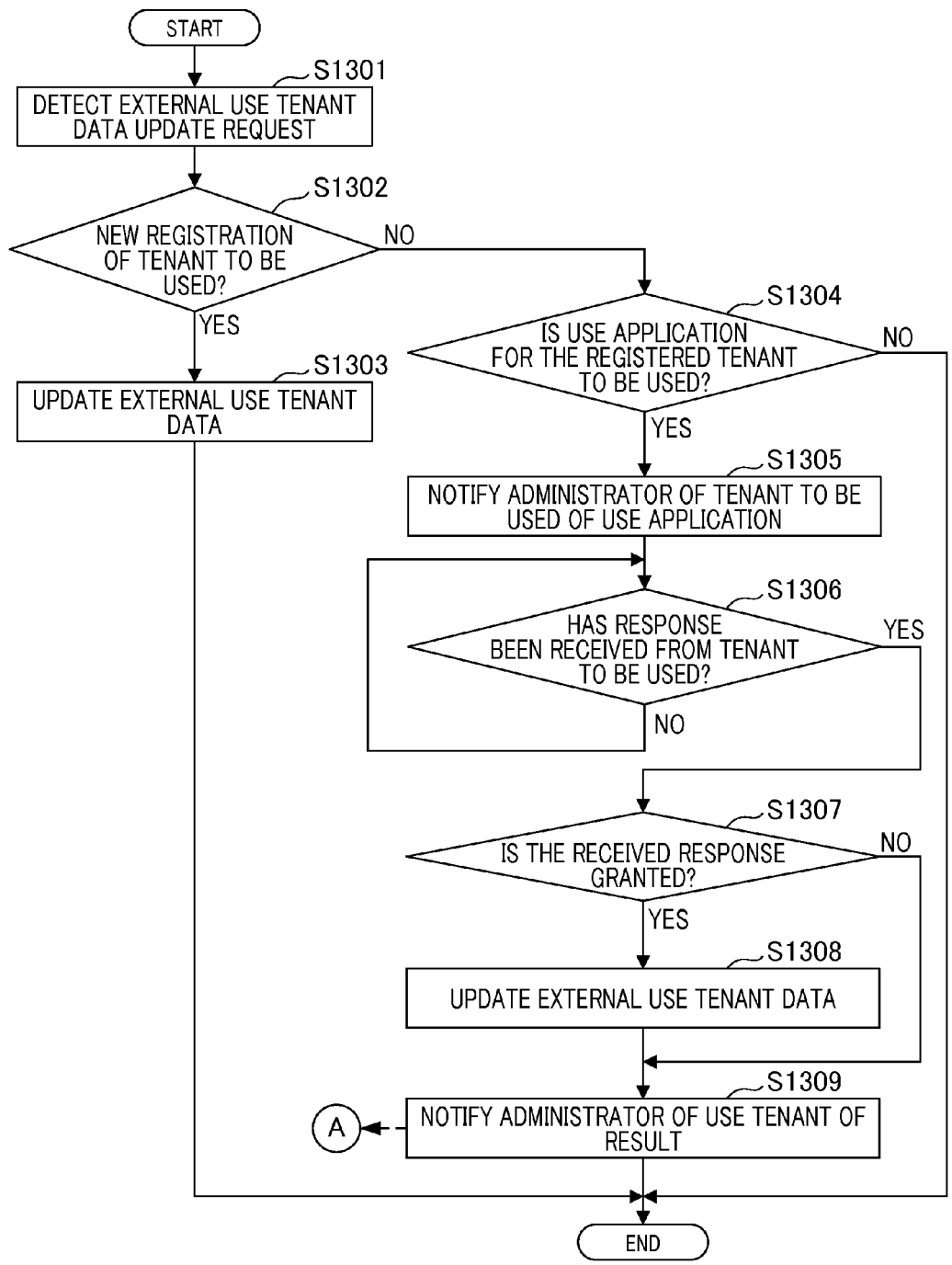
FIG. 13 is a flowchart illustrating processing for updating external use tenant data.

FIG. 13 is an exemplary flowchart illustrating processing for updating external use tenant data. Firstly, the terminal apparatus 102 which is operated by the administrator of a tenant to be used or the administrator of a use tenant makes an external use tenant data update request to the setting value management service 310. The update request includes the identifier (use tenant identifier) of a use tenant and the identifier (used-tenant identifier) of a tenant to be used, both of which are to be updated. Then, the external use tenant data updating unit 334 detects an external use tenant data update request (step S1301).

Next, the external use tenant data updating unit 334 determines whether or not the external use tenant data update request is a request for new registration of a tenant to be used (step S1302). When the external use tenant data update request is not a request for new registration of a tenant to be used, the process advances to step S1304.

When the external use tenant data update request is a request for a new registration of a tenant to be used, the external use tenant data updating unit 334 updates external use tenant data held by the external use tenant data holding unit 333 (step S1303). More specifically, the external use tenant data updating unit 334 adds a record corresponding to the used-tenant identifier and the tenant identifier included in the external use tenant data update request to the external use tenant data shown in FIG. 10.

In step S1304, the external use tenant data updating unit 334 determines whether or not the external use tenant data update request is a use application for the registered tenant to be used (step S1304). The registered tenant to be used is a tenant to be used corresponding to the used-tenant identifier included in external use tenant data. When the external use tenant data update request is not a use application for the tenant to be used, the process ends.

When the external use tenant data update request is a use application for the tenant to be used, the external use tenant data updating unit 334 notifies the tenant to be used of the fact that a use application has been made (step S1305). More specifically, the external use tenant data updating unit 334 transmits an e-mail which is addressed with the administrator of the tenant to be used. The content of the e-mail indicates the fact that a use application has been made from the use tenant and prompts the administrator to respond by indicating whether the use is "permitted" or "rejected" as a response to the use application.

Next, the external use tenant data updating unit 334 determines whether or not the response for the use application has been received from the tenant to be used (step S1306). The content of the response is either "permitted" or "rejected". When the external use tenant data updating unit 334 has not received the response for the use application from the tenant to be used, the process returns to step S1306. When the external use tenant data updating unit 334 has received the response for the use application from the tenant to be used, the process advances to step S1307.

In step S1307, the external use tenant data updating unit 334 determines whether or not the content of the response received from the tenant to be used is "permitted" (step S1307). When the content of the response received from the tenant to be used is "not permitted" but "rejected", the process advances to step S1309. When the content of the response received from the tenant to be used is "permitted", the process advances to step S1308.

In step S1308, the external use tenant data updating unit 334 updates external use tenant data (step S1308). For example, among the records on external use tenant data, the external use tenant data updating unit 334 specifies a record which corresponds to the used-tenant identifier included in the external use tenant data update request and of which the use tenant identifier is not set. Then, the external use tenant data updating unit 334 sets a use tenant identifier included in the external use tenant data update request to the specified record.

Next, the external use tenant data updating unit 334 notifies the use tenant of the result of the use application (step S1309). More specifically, the external use tenant data updating unit 334 transmits an e-mail which is addressed with the administrator of the use tenant. The e-mail includes the content of the notification of the fact that the use application has been either "permitted" or "rejected". Also, the e-mail includes the content for prompting the administrator to make an external tenant configuration data update request if the use application is "permitted".

FIG. 14 is an exemplary flowchart illustrating processing for generating virtual configuration data. Firstly, the terminal apparatus 102 transmits an external tenant configuration data update request to the setting value management service 310 in accordance with the operation performed by the administrator of the use tenant. The external tenant configuration data update request includes correspondence information between a use tenant identifier and a used-tenant identifier. The use tenant identifier is the identifier of a use tenant, i.e., the identifier of a tenant corresponding to a user who is the transmission source of the update request. Also, the used-tenant identifier is the identifier of a tenant (a tenant to be used) to which the image forming apparatus 101 used by the user belongs. The external tenant configuration data update request further includes information for specifying external tenant configuration data to be updated. Next, the external tenant configuration data updating unit 332 provided in the setting value management service 310 detects the external tenant configuration data update request (step S1401).

Next, the external tenant configuration data updating unit 332 determines whether or not the use tenant has the authority to use external tenant configuration data. In this example, the external tenant configuration data updating unit 332 determines whether or not the administrator of the use tenant has the authority to update external tenant configuration data (step S1402). More specifically, among the records on external use tenant data, the external tenant configuration data updating unit 332 determines whether or not there is a record corresponding to the use tenant identifier and the used-tenant identifier both included in the external tenant configuration data update request.

When there is a record corresponding to the use tenant identifier and the used-tenant identifier both included in the external tenant configuration data update request, the external tenant configuration data updating unit 332 determines that the administrator has the authority to update external tenant configuration data. Then, the process advances to step S1403. When there is no record corresponding to the use tenant identifier and the used-tenant identifier both included in the external tenant configuration data update request, the external tenant configuration data updating unit 332 determines that the administrator has no authority to update external tenant configuration data. Then, the process ends.

In step S1403, the external tenant configuration data updating unit 332 acquires information, which is included in the external tenant configuration data update request, for specifying external tenant configuration data to be updated. Then, the external tenant configuration data updating unit 332 determines whether or not external tenant configuration data has already been registered based on the acquired information (step S1403). More specifically, the external tenant configuration data updating unit 332 determines whether or not external tenant configuration data to be updated is present on external tenant configuration data held by the external tenant configuration data holding unit 331.

When external tenant configuration data to be updated is present on external tenant configuration data, the external tenant configuration data updating unit 332 determines that external tenant configuration data has already been registered. Then, the process advances to step S1408. When there is no external tenant configuration data to be updated in the external tenant configuration data, the external tenant configuration data updating unit 332 determines that external tenant configuration data has not yet been registered. Then, the process advances to step S1404.

In step S1404, the external tenant configuration data updating unit 332 acquires a virtual device, which is associated with a tenant to be used corresponding to the external tenant configuration data update request, from the virtual device holding unit 311. The external tenant configuration data updating unit 332 acquires virtual device configuration data included in the acquired virtual device. Then, the external tenant configuration data updating unit 332 acquires a model code included in the acquired virtual device configuration data (step S1404).

Next, the external tenant configuration data updating unit 332 acquires a model-specific setting value schema corresponding to the acquired model code from the model-specific setting value schema holding unit 312 (step S1405). Next, the external tenant configuration data updating unit 332 lists up the setting items included in at least one of the model-specific setting value schemas acquired in step S1405 (step S1406). Then, the external tenant configuration data updating unit 332 generates blank external tenant configuration data having the setting items listed up in step S1406 (step S1407), and the process advances to step S1408.

In step S1408, the external tenant configuration data updating unit 332 detects a specific update instruction for updating external tenant configuration data (step S1408). Then, the external tenant configuration data updating unit 332 updates external tenant configuration data based on the update instruction detected in step S1408 (step S1409). In other words, the external tenant configuration data updating unit 332 updates external tenant configuration data using the acceptance of the external tenant configuration data update request as a trigger. The external tenant configuration data holding unit 331 stores the updated external tenant configuration data.

Next, the virtual configuration data generating unit 316 detects that external tenant configuration data has been updated (step S1410). Then, the virtual configuration data generating unit 316 searches a virtual device, of which the tenant identifier matches the tenant identifier of external tenant configuration data of which an update has been detected, from the virtual devices held by the virtual device holding unit 311. In order to perform processing for the searched virtual devices in sequence, the virtual configuration data generating unit 316 acquires one virtual device. The virtual configuration data generating unit 316 determines whether or not the virtual device is successively acquired (step S1411). When processing for all virtual devices is performed in sequence and the next virtual device cannot be acquired, the process ends. When the virtual configuration data generating unit 316 successively acquires the next virtual device, the process advances to step S1412.

In step S1412, the virtual configuration data generating unit 316 acquires virtual device configuration data from a virtual device to be processed (step S1412). Next, the virtual configuration data generating unit 316 acquires a model code from virtual device configuration data acquired in step S1412. Then, the virtual configuration data generating unit 316 acquires a model-specific setting value schema corresponding to the acquired model code from the model-specific setting value schema holding unit 312 (step S1413).

Next, the virtual configuration data generating unit 316 generates virtual configuration data based on virtual device configuration data, the model-specific setting value schema, and external tenant configuration data (step S1414). The generated virtual configuration data functions as third operation setting information. Processing for generating virtual configuration data in step S1414 is executed in the same manner as processing for generating virtual configuration data using tenant configuration data in step S913 shown in FIG. 11. Next, the virtual configuration data updating unit 317 registers the generated virtual configuration data in the virtual device (step S1415), and the process returns to step S1411.

From the foregoing description, the external tenant configuration data updating unit 332 updates external tenant configuration data when correspondence information between the use tenant identifier and the used-tenant identifier included in the external tenant configuration data update request matches external use tenant data.

Also, the external tenant configuration data updating unit 332, the virtual configuration data generating unit 316, and the virtual configuration data updating unit 317 collectively function as a generating unit that executes the following processing. The virtual configuration data generating unit 316 generates virtual configuration data which is applied to the image forming apparatus, when a user who corresponds to the second management range uses the image forming apparatus belonging to the first management range, using external tenant configuration data (see step S1414).

In other words, the virtual configuration data generating unit 316 generates virtual configuration data based on external tenant configuration data, virtual device configuration data, and the model-specific setting value schema. Virtual device configuration data is included in a virtual device associated with a tenant to be used to which an image forming apparatus used by a user who corresponds to a use tenant belongs. Also, the model-specific setting value schema is information, which is pre-stored in a storage unit, indicating a condition relating to operation settings in accordance with the model indicated by virtual device configuration data.

Then, the virtual configuration data updating unit 317 generates and registers a record of a virtual device corresponding to the generated virtual configuration data (stores it in a storage unit) (see step S1415). The record of the virtual device is device information including correspondence information among at least virtual configuration data, the use tenant identifier, and virtual device configuration data.

Note that the tenant configuration data updating unit 315 that executes processing for updating tenant configuration data described with reference to FIG. 11 functions as a part of the generating unit. Then, virtual configuration data (see step S913 shown in FIG. 11) generated by the tenant configuration data updating unit 315 is fourth operation setting information.

FIG. 15 is an exemplary flowchart illustrating processing for acquiring virtual configuration data by an image forming apparatus. Processing to be described with reference to FIG. 15 corresponds to the use of configuration data across a plurality of tenants.

Firstly, the user tenant identifier accepting unit 307 of the image forming apparatus 101 accepts an input of a user tenant identifier from the terminal device 102 operated by a user who uses the image forming apparatus 101 (step S1501). Next, the actual device configuration data notifying unit 306 determines whether or not there is a tenant identifier which matches the user tenant identifier accepted in step S1501 among the tenant identifiers held by the tenant identifier holding unit 305 (step S1502). In this example, the tenant identifiers held by the tenant identifier holding unit 305 are used-tenant identifiers indicating tenants to be used (first management range). Also, the user tenant identifier is a use tenant identifier indicating a use tenant (second management range).

When there is a tenant identifier which matches the user tenant identifier among the tenant identifiers held by the tenant identifier holding unit 305, the process ends. In this case, this means that a user intends to use the image forming apparatus 101 belonging to a tenant corresponding to the user.

When there is no tenant identifier which matches the user tenant identifier among the tenant identifiers held by the tenant identifier holding unit 305, the process advances to step S1503. In this case, it means that a user intends to use the image forming apparatus 101 not belonging to a tenant corresponding to the user. In this case, the user tenant identifier functions as a use tenant identifier. The tenant identifier held by the tenant identifier holding unit 305 functions as a used-tenant identifier.

The image forming apparatus 101 may also be adapted to acquire a user tenant identifier and execute determination processing in step S1502 using the acquired user tenant identifier as follows. The image forming apparatus 101 manages a user tenant identifier in advance by associating it with authentication information about a user. When a user logs in the image forming apparatus 101, the image forming apparatus 101 performs authentication processing using authentication information used by the user. Then, the image forming apparatus 101 acquires a user tenant identifier associated with authentication information.

In step S1503, the actual device configuration data collecting unit 304 collects actual device configuration data (step S1503). The actual device configuration data notifying unit 306 notifies the setting value management service 310 about a configuration data generation request including actual device configuration data, the user tenant identifier, and the used-tenant identifier (the tenant identifier held by the tenant identifier holding unit 305) (step S1504). A notification destination address is an address held by the actual configuration data holding unit 301.

In step S1551, the setting value management service 310 detects the notification to thereby perform processing. A detailed description of processing executed by the setting value management service 310 will be given below.

The virtual configuration data receiving unit 303 waits for execution of processing until the update of virtual configuration data is completed (step S1505). Next, the virtual configuration data receiving unit 303 receives virtual configuration data from the setting value management service 310. In other words, the virtual configuration data receiving unit 303 functions as an acquiring unit that acquires operation setting information corresponding to the image forming apparatus 101 from the setting value management service 310 that has generated (updated) virtual configuration data in response to the configuration data generation request. Then, the virtual configuration data updating unit 317 updates the received virtual configuration data as actual configuration data (step S1507). Actual configuration data is stored by the actual configuration data holding unit 301.

In step S1051, the actual device configuration data receiving unit 318 of the setting value management service 310 functions as a request accepting unit that accepts a configuration data generation request from the image forming apparatus 101 (step S1551). More specifically, the actual device configuration data receiving unit 318 accepts the configuration data generation request from an image forming apparatus, which belongs to a tenant to be used, which is used by a user who corresponds to a use tenant, via the Internet 104. Then, the actual device configuration data receiving unit 318 refers to external use tenant data, and determines whether or not a tenant indicated by the user tenant identifier included in the configuration data generation request has the authority to use external use tenant data (step S1552). More specifically, among the records on external use tenant data, the actual device configuration data receiving unit 318 determines whether or not there is a record corresponding to the user tenant identifier and the used-tenant identifier both included in the configuration data generation request.

When there is no record corresponding to the use tenant identifier and the used-tenant identifier both included in the external tenant configuration data update request among the records on external use tenant data, the actual device configuration data receiving unit 318 determines that the tenant indicated by the user tenant identifier has no authority to use external use tenant data. Then, the actual device configuration data receiving unit 318 notifies the virtual configuration data receiving unit 303 of the image forming apparatus 101 of the occurrence of errors (step S1553).

When there is a record corresponding to the user tenant identifier and the used-tenant identifier both included in the configuration data generation request among the records on external use tenant data, the actual device configuration data receiving unit 318 determines that the tenant indicated by the user tenant identifier has the authority to use external use tenant data. Then, the process advances to step S1554.

In step S1554, the virtual device configuration data updating unit 319 searches for a virtual device corresponding to actual device configuration data, the used-tenant identifier, and the user tenant identifier that are included in the configuration data generation request received in step S1551, and determines whether or not the search is successful. Actual device configuration data is configuration information about the devices provided in the image forming apparatus 101 belonging to the first management range (tenant to be used) used by a user. When the image forming apparatus 101 communicates with the setting value management service 310 for the first time, there may be cases where a virtual device cannot be found. Thus, in this case, the process advances to step S1555, and the virtual device configuration data updating unit 319 generates a blank virtual device (step S1555). Then, the process advances to step S1556.

When a virtual device is successfully found in step S1554, the virtual configuration data acquiring unit 320 acquires virtual configuration data about the virtual device that has been found, and transmits the acquired virtual configuration data to the virtual configuration data receiving unit 303 of the image forming apparatus 101 (step S1556).

As seen from the description with reference to FIG. 15, the virtual device configuration data updating unit 319 and the virtual configuration data acquiring unit 320 collectively function as an information transmitting unit that executes the following processing. Specifically, the information transmitting unit acquires virtual configuration data corresponding to the image forming apparatus 101 used by a user based on actual device configuration data, the used-tenant identifier, and the virtual device which are included in the configuration data generation request (see steps S1554 and S1556 shown in FIG. 15). Then, the information transmitting unit transmits the acquired virtual configuration data to the image forming apparatus 101 (step S1556).

Next, a description will be given of another embodiment. During the process described with reference to FIG. 14, the virtual configuration data generating unit 316 generates virtual configuration data using the update of external tenant configuration data as a trigger. However, the virtual configuration data generating unit 316 may also generate virtual configuration data using the start of the use of an image forming apparatus by a user as a trigger. More specifically, the setting value management service 310 omits processing in step S1410 and subsequent steps shown in FIG. 14, and executes the processing in steps S1412 to S1415 shown in FIG. 14 subsequent to the processing in step S1554 shown in FIG. 15.

In other words, the virtual configuration data generating unit 316 executes the following processing using the acceptance of the configuration data generation request by the actual device configuration data receiving unit 318 as a trigger. The virtual configuration data generating unit 316 generates virtual configuration data, which corresponds to the image forming apparatus 101 which is the transmission source of the configuration data generation request, using external tenant configuration data. Then, the virtual configuration data acquiring unit 320 transmits the generated virtual configuration data to the image forming apparatus 101. Note that the setting value management service 310 may also detect the completion of use of an image forming apparatus by a user to thereby delete the generated virtual configuration data.

The actual configuration data updating unit 302 may temporarily store the virtual configuration data acquired in step S1507 shown in FIG. 15 in the volatile memory 203A so as to save actual configuration data held by the actual configuration data holding unit 301 in the nonvolatile memory 202B. Then, the actual configuration data updating unit 302 may detect the completion of use of an image forming apparatus by a user to thereby execute the following processing. The actual configuration data updating unit 302 returns actual configuration data held by the actual configuration data holding unit 301, i.e., actual configuration data for use by a user, back to actual configuration data saved in the non-volatile memory 202B. In other words, the actual configuration data updating unit 302 recovers operation setting information which is applied to the image forming apparatus 101 back to operation setting information which has been applied to the image forming apparatus 101 prior to the use of the image forming apparatus 101 using the completion of the use of the image forming apparatus 101 by a user as a trigger.

According to the information processing system of the present invention described by taking various exemplary embodiments, the operation setting which is applied to an image forming apparatus within a user management range can be automatically applied to an image forming apparatus which lies outside the management range and is used by a user.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-230251 filed Oct. 20, 2011, which is hereby incorporated by reference herein in its entirety.

What is claimed is:

1. An information processing system comprising:
a management apparatus that manages operation setting information for switching the operation of an image forming apparatus; and
an image forming apparatus that is managed by the management apparatus for each preset management range of a user,
wherein the image forming apparatus comprises:
a requesting unit configured to transmit an acquisition request for operation setting information corresponding to the image forming apparatus, which includes configuration information about the devices provided in the image forming apparatus and information regarding the management range of a user who uses the image forming apparatus, to the management apparatus via a network; and
an acquiring unit configured to acquire the operation setting information from the management apparatus as a response to the operation setting information acquisition request, and
wherein the management apparatus comprises:
a first holding unit configured to hold first operation setting information which is applied to the image forming apparatus belonging to a first management range which is the management range managed by the management apparatus;
a second holding unit configured to hold second operation setting information which is commonly applied to the image forming apparatus belonging to a second management range;
a generating unit configured to generate third operation setting information which is applied to the image forming apparatus, when a user who corresponds to the second management range uses the image forming apparatus belonging to the first management range, using the second operation setting information, and configured to store information including correspondence information among the third operation setting information, information regarding the second management range, and configuration information about the devices provided in an image forming apparatus used by the user as device information in a storage unit;
a request accepting unit configured to accept the operation setting information acquisition request from an image forming apparatus belonging to the first management range, which is used by a user who corresponds to the second management range, via the network; and
an information transmitting unit configured to acquire the third operation setting information corresponding to the image forming apparatus based on configuration information about the devices provided in an image forming apparatus, which is used by the user, belonging to the first management range, the information regarding the second management range corresponding to the user, and the device information stored in the storage unit, all of which are included in the accepted operation setting information acquisition request, and configured to transmit them to the image forming apparatus.

2. The information processing system according to claim 1, wherein the generating unit provided in the management apparatus updates the second operation setting information using the acceptance of an update request for the second operation setting information as a trigger, and generates the third operation setting information using the second operation setting information.

3. The information processing system according to claim 2, wherein the management apparatus further comprises an authorized tenant storage unit that pre-stores correspondence information between identification information about the first management range managed by the management apparatus and identification information about the second management range corresponding to a user to whom the management apparatus permits the use of an image forming apparatus belonging to the first management range as authorized tenant information,
wherein the second operation setting information update request includes correspondence information between identification information about the management range corresponding to a user who is the transmission source of the update request and identification information about the first management range to which an image forming apparatus used by the user belongs, and
wherein the generating unit updates the second operation setting information if correspondence information included in the second operation setting information update request matches authorized tenant information stored in the authorized tenant storage unit.

4. The information processing system according to claim 1, wherein the generating unit provided in the management apparatus generates the third operation setting information corresponding to an image forming apparatus which is the transmission source for the acquisition request using the second operation setting information using the acceptance of the operation setting information acquisition request by the request accepting unit as a trigger, and
wherein the information transmitting unit provided in the management apparatus transmits the generated third operation setting information to an image forming apparatus corresponding to the operation setting information acquisition request.

5. The information processing system according to claim 1, wherein the image forming apparatus further comprises an applying unit configured to apply the operation setting information acquired by the acquiring unit to the image forming apparatus, and
wherein the applying unit returns operation setting information which is applied to the image forming apparatus to operation setting information which has been applied to the image forming apparatus prior to the use of the image forming apparatus using the completion of the use of the image forming apparatus by the user as a trigger.

6. The information processing system according to claim 1, wherein the generating unit provided in the management apparatus further generates fourth operation setting information which is applied to an image forming apparatus, when a user who corresponds to the first management range uses the image forming apparatus belonging to the first management range, using the updated first operation setting information using the update of the first operation setting information as a trigger, and stores the device information including correspondence information among the fourth operation setting information, information regarding the first management range, and configuration information about the devices provided in an image forming apparatus belonging to the first management range in the storage unit.

7. The information processing system according to claim 1, wherein the generating unit provided in the management apparatus generates the third operation setting information based on the second operation setting information, configuration information about a device included in the device information associated with the first management range to which an image forming apparatus used by a user who corresponds to the second management range belongs, and information, which is pre-stored in a storage unit, indicating a condition relating to operation settings in accordance with the model indicated by configuration information about the device.

8. A method for managing operation setting information using an information processing system comprising a management apparatus that manages operation setting information for switching the operation of an image forming apparatus and an image forming apparatus that is managed by the management apparatus for each preset management range of a user, the method comprising:

holding, by the management apparatus, first operation setting information which is applied to an image forming apparatus belonging to a first management range which is the management range managed by the management apparatus;

holding, by the management apparatus, second operation setting information which is commonly applied to the image forming apparatus belonging to a second management range;

generating, by the management apparatus, third operation setting information which is applied to the image forming apparatus, when a user who corresponds to the second management range uses the image forming apparatus belonging to the first management range, using the second operation setting information, and storing information including correspondence information among the third operation setting information, information regarding the second management range, and configuration information about the devices provided in an image forming apparatus as device information in a storage unit;

transmitting, by an image forming apparatus belonging to the first management range, an acquisition request for operation setting information corresponding to the image forming apparatus, which includes configuration information about the devices provided in the image forming apparatus and information regarding the second management range corresponding to a user who uses the image forming apparatus, to the management apparatus via a network;

accepting, by the management apparatus, the operation setting information acquisition request from an image forming apparatus belonging to the first management range, which is used by a user who corresponds to the second management range, via the network; and acquiring, by the management apparatus, the third operation setting information corresponding to the image forming apparatus based on configuration information about the devices provided in an image forming apparatus, which is used by the user, belonging to the first management range, the information regarding the second management range corresponding to the user, and the device information stored in the storage unit, all of which are included in the accepted operation setting information acquisition request, and transmitting them to the image forming apparatus.

9. A non-transitory storage medium on which is stored a computer program for making a computer execute a method for managing operation setting information using an information processing system comprising a management apparatus that manages operation setting information for switching the operation of an image forming apparatus and an image forming apparatus that is managed by the management apparatus for each preset management range of a user, the method comprising:

holding, by the management apparatus, first operation setting information which is applied to an image forming apparatus belonging to a first management range which is the management range managed by the management apparatus;

holding, by the management apparatus, second operation setting information which is commonly applied to the image forming apparatus belonging to a second management range;

generating, by the management apparatus, third operation setting information which is applied to the image forming apparatus, when a user who corresponds to the second management range uses the image forming apparatus belonging to the first management range, using the second operation setting information, and storing information including correspondence information among the third operation setting information, information regarding the second management range, and configuration information about the devices provided in an image forming apparatus as device information in a storage unit;

transmitting, by an image forming apparatus belonging to the first management range, an acquisition request for operation setting information corresponding to the image forming apparatus, which includes configuration information about the devices provided in the image forming apparatus and information regarding the second management range corresponding to a user who uses the image forming apparatus, to the management apparatus via a network;

accepting, by the management apparatus, the operation setting information acquisition request from an image forming apparatus belonging to the first management range, which is used by a user who corresponds to the second management range, via the network; and acquiring, by the management apparatus, the third operation setting information corresponding to the image forming apparatus based on configuration information about the devices provided in an image forming apparatus, which is used by the user, belonging to the first management range, the information regarding the second management range corresponding to the user, and the device information stored in the storage unit, all of which are included in the accepted operation setting information acquisition request, and transmitting them to the image forming apparatus.

* * * * *